(12) United States Patent
Otsubo

(10) Patent No.: US 12,429,708 B2
(45) Date of Patent: Sep. 30, 2025

(54) METHOD FOR MANUFACTURING AERIAL IMAGE FORMATION DEVICE, AND AERIAL IMAGE FORMATION DEVICE

(71) Applicant: Asukanet Company, Ltd., Hiroshima (JP)

(72) Inventor: Makoto Otsubo, Hiroshima (JP)

(73) Assignee: ASUKANET COMPANY, LTD., Hiroshima (JP)

( * ) Notice: Subject to any disclaimer, the term of this patent is extended or adjusted under 35 U.S.C. 154(b) by 93 days.

(21) Appl. No.: 18/291,347

(22) PCT Filed: Mar. 10, 2022

(86) PCT No.: PCT/JP2022/010679
§ 371 (c)(1),
(2) Date: Jan. 23, 2024

(87) PCT Pub. No.: WO2023/007816
PCT Pub. Date: Feb. 2, 2023

(65) Prior Publication Data
US 2024/0210724 A1    Jun. 27, 2024

(30) Foreign Application Priority Data
Jul. 26, 2021  (JP) .................... 2021-121746

(51) Int. Cl.
*G02B 30/56*      (2020.01)
*B29D 11/00*      (2006.01)
(Continued)

(52) U.S. Cl.
CPC ........ *G02B 30/56* (2020.01); *B29D 11/00432* (2013.01); *G02B 1/11* (2013.01); *G02B 30/60* (2020.01)

(58) Field of Classification Search
CPC .......... G02B 30/56; G02B 1/11; G02B 30/60; G02B 5/136; G02B 17/006; B29D 11/00432
See application file for complete search history.

(56) References Cited

U.S. PATENT DOCUMENTS 7,457,040 B2 *  11/2008  Amitai ............... G02B 27/1073
                                                    359/857
10,761,314 B1 *  9/2020  Richards .............. G02B 17/006
(Continued)

FOREIGN PATENT DOCUMENTS

JP    2021-81451 A      5/2021
WO   2009/131128 A1    10/2009
(Continued)

OTHER PUBLICATIONS

International Search Report dated May 24, 2022, issued in counterpart International Application No. PCT/JP2022/010679, with English Translation. (4 pages).

*Primary Examiner* — Alazar Tilahun
(74) *Attorney, Agent, or Firm* — WHDA, LLP

(57) ABSTRACT

An aerial image formation device 10 comprising two light control panels 28 each including a molding 21 being produced by using a transparent resin, the molding 21 including, on one surface side thereof, a plurality of straight grooves 18 disposed in parallel at a predetermined interval. The straight grooves 18 each have a trapezoidal cross section and expand on the one surface side of the molding 21, with one side surface serving as the vertical surface 16. In each of the two light control panels 28, an inner surface of each of the straight grooves 18 is covered with a light reflecting material 25 and an anti-reflection layer 27 is formed on a surface of the light reflecting material 25.

14 Claims, 14 Drawing Sheets

(51) Int. Cl.
 G02B 1/11 (2015.01)
 G02B 30/60 (2020.01)

(56) References Cited

U.S. PATENT DOCUMENTS

| | | | |
|---|---|---|---|
| 2003/0197944 A1* | 10/2003 | Ohishi | G02B 27/148 |
| | | | 348/E9.027 |
| 2017/0017089 A1 | 1/2017 | Kim et al. | |
| 2017/0146705 A1 | 5/2017 | Otsubo | |
| 2018/0164671 A1* | 6/2018 | Kinoshita | G02B 5/02 |
| 2018/0246337 A1* | 8/2018 | Makiguchi | G02B 5/12 |
| 2020/0001556 A1 | 1/2020 | Otsubo | |
| 2023/0099636 A1 | 3/2023 | Otsubo | |

FOREIGN PATENT DOCUMENTS

| | | |
|---|---|---|
| WO | 2015/198499 A1 | 12/2015 |
| WO | 2018/138932 A1 | 8/2018 |
| WO | 2018/138940 A1 | 8/2018 |
| WO | 2018/139035 A1 | 8/2018 |
| WO | 2019/021497 A1 | 1/2019 |

* cited by examiner

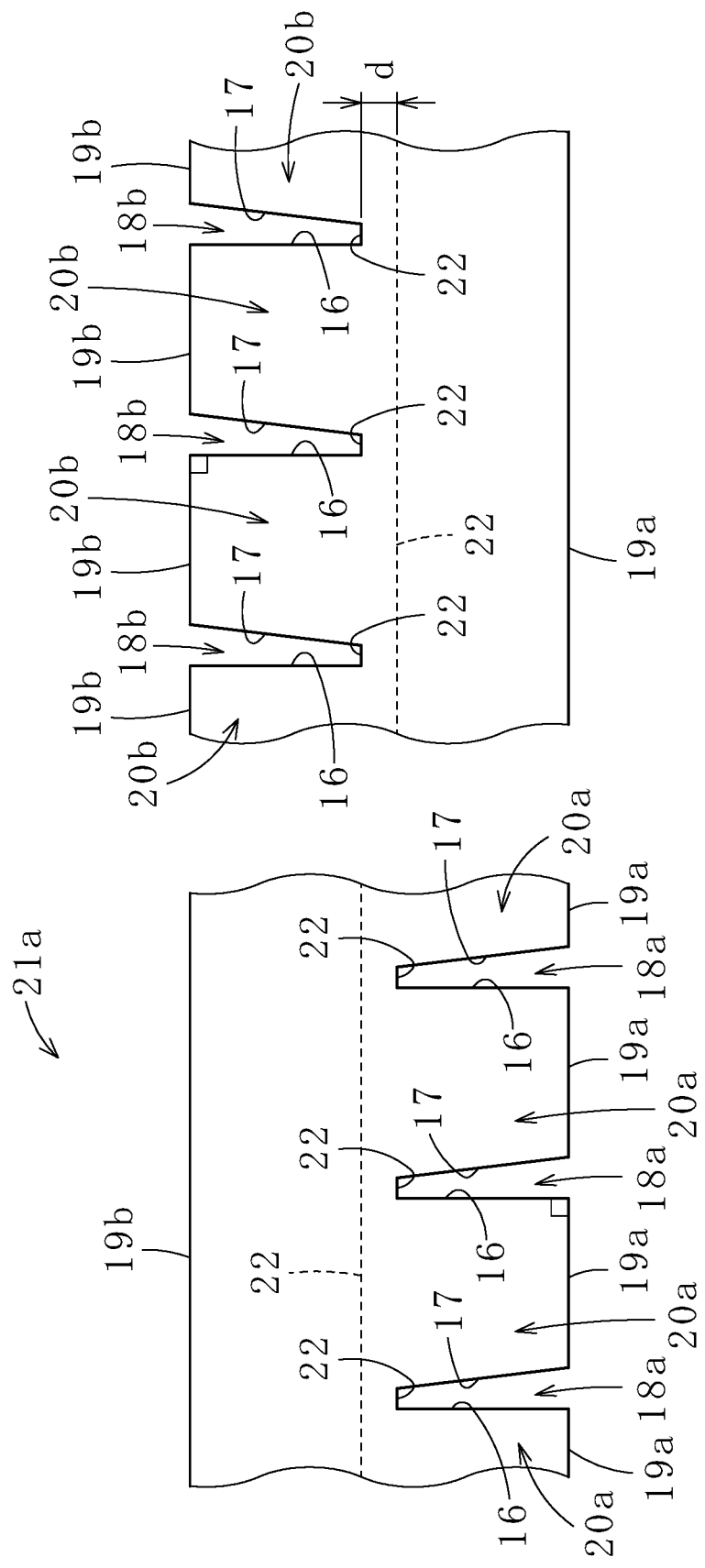

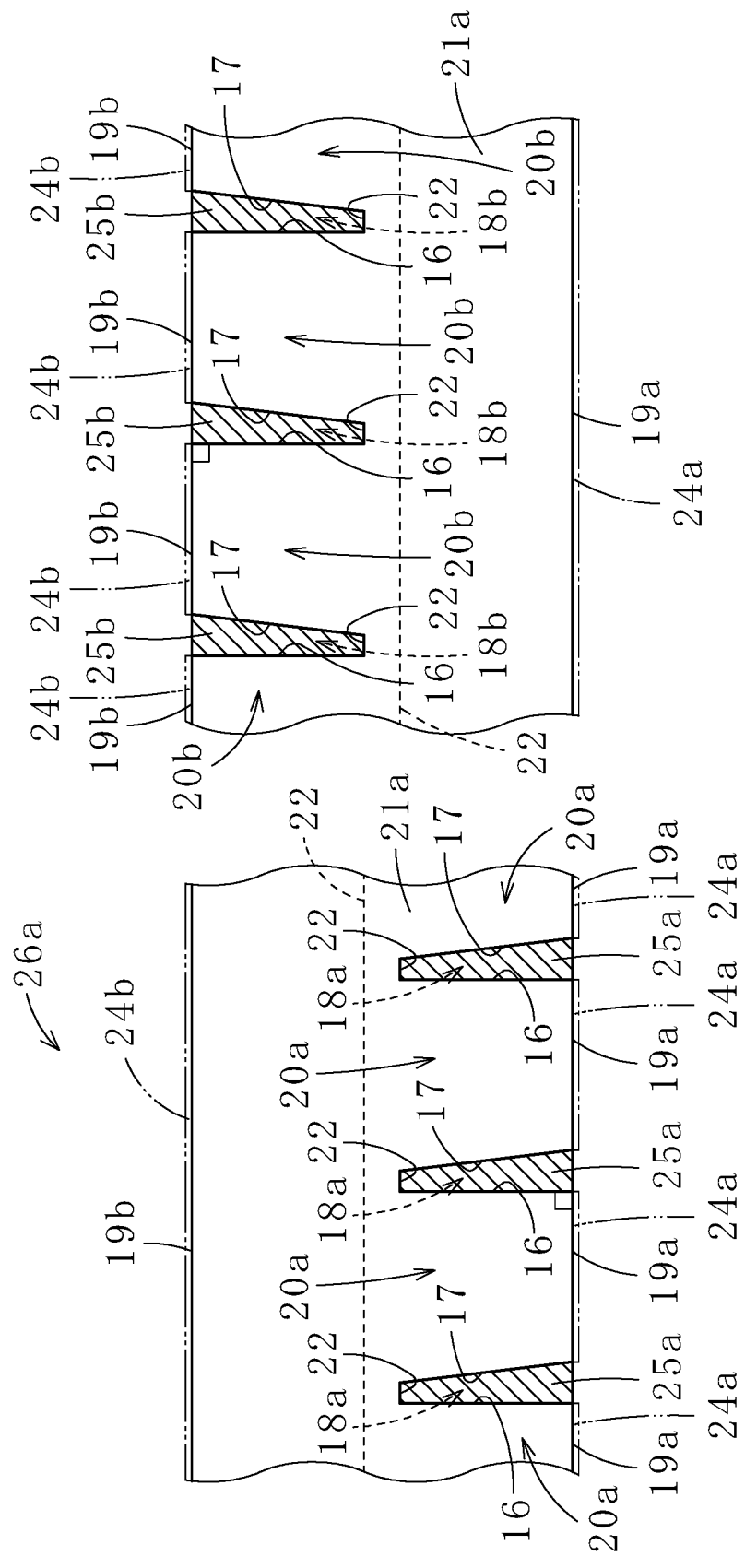

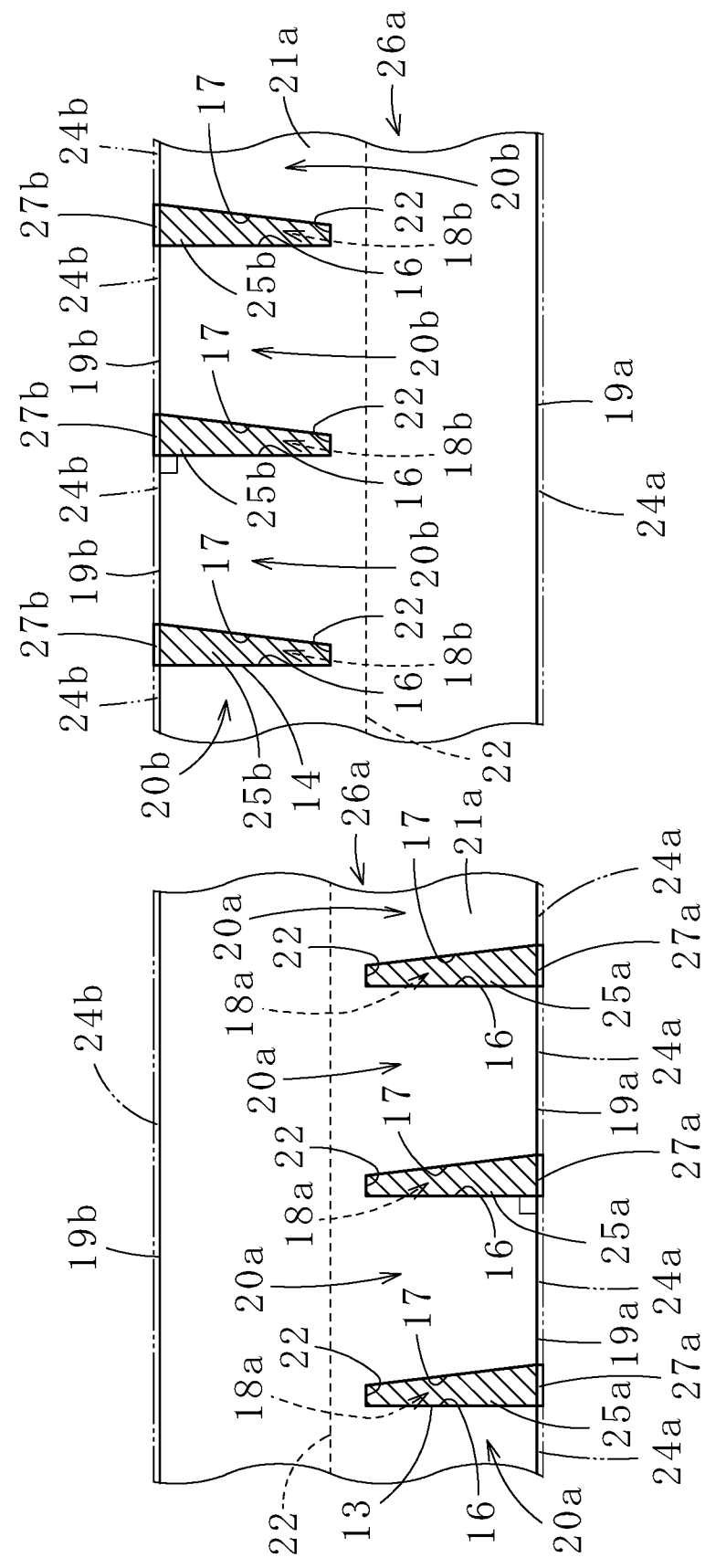

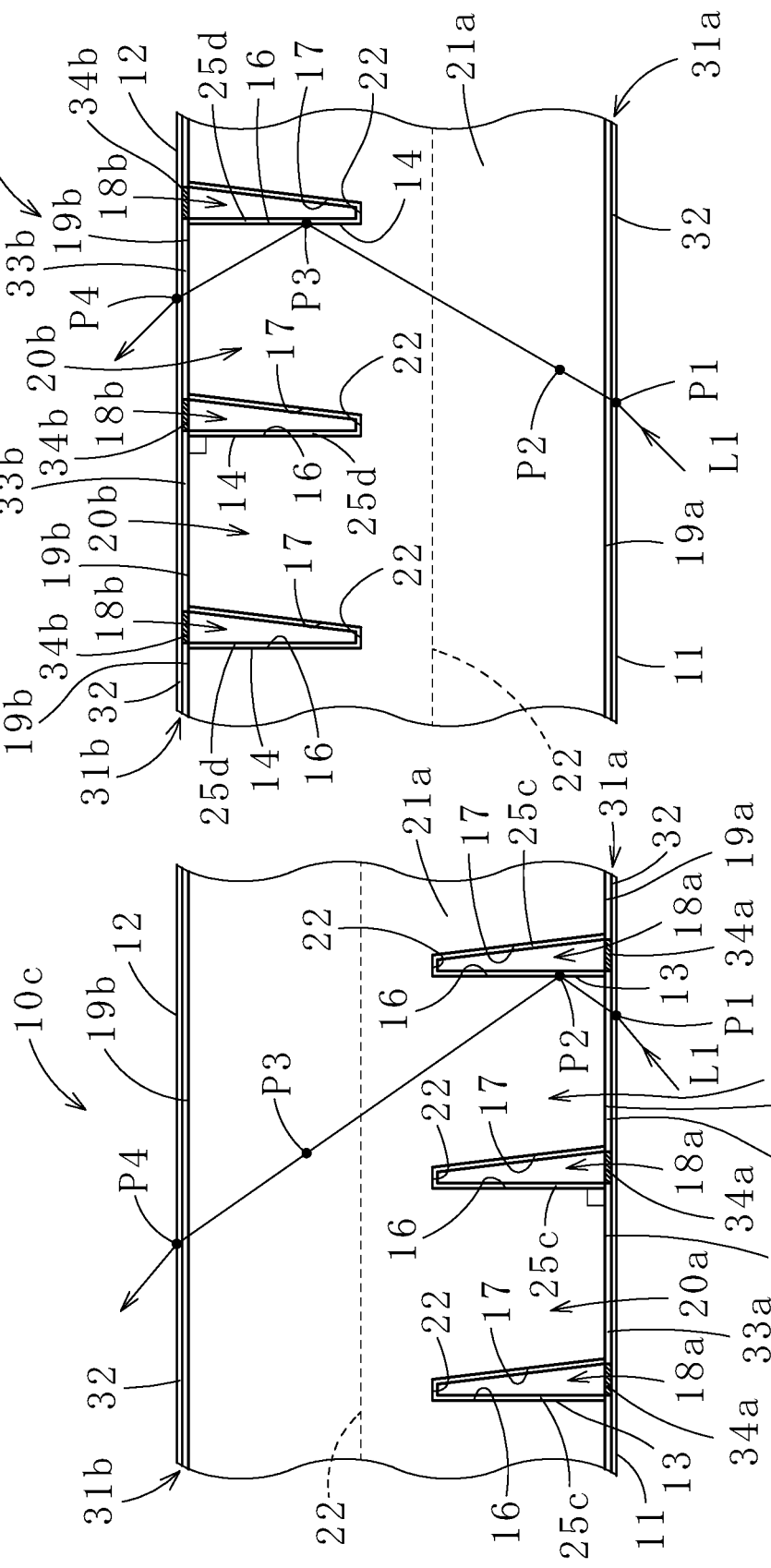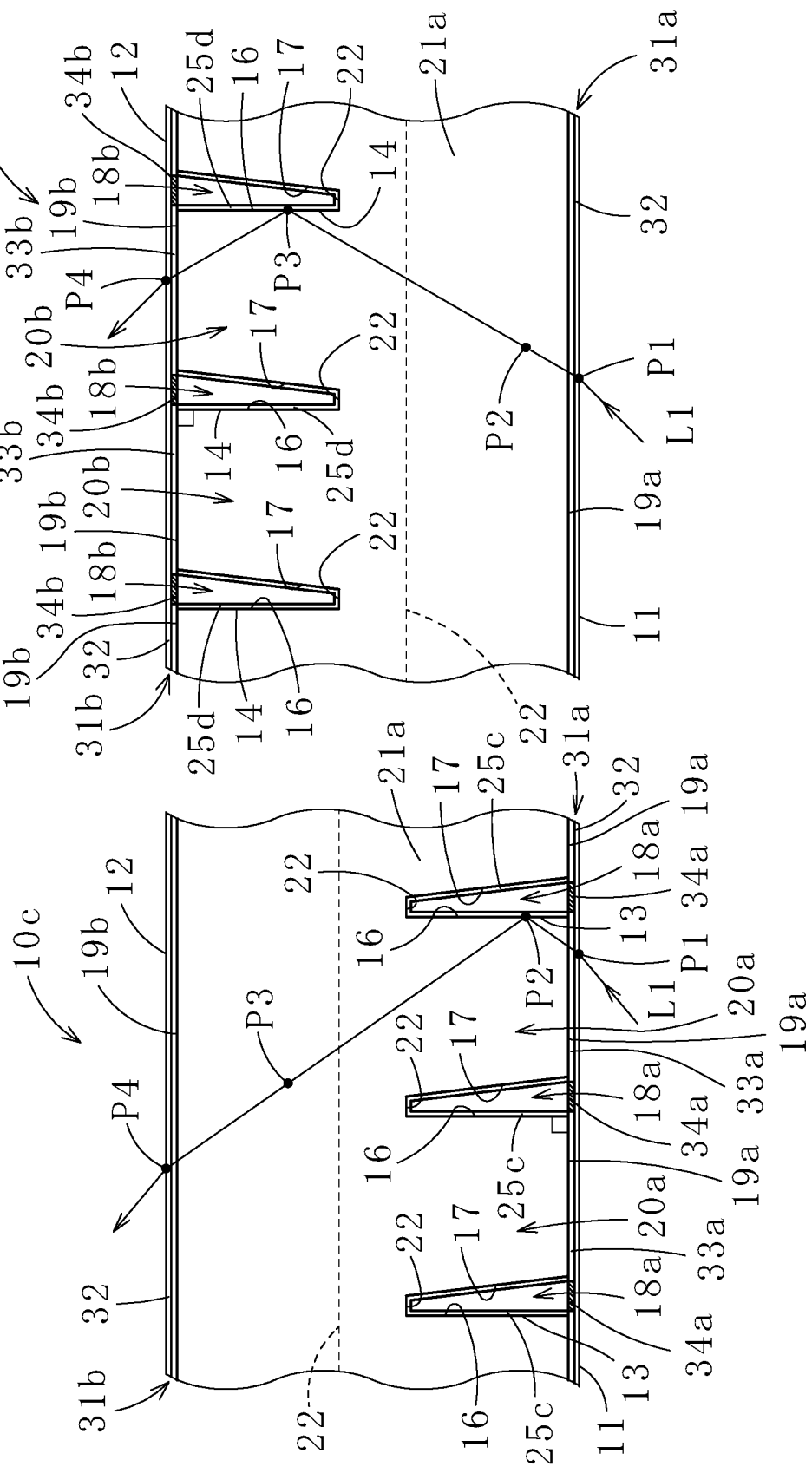

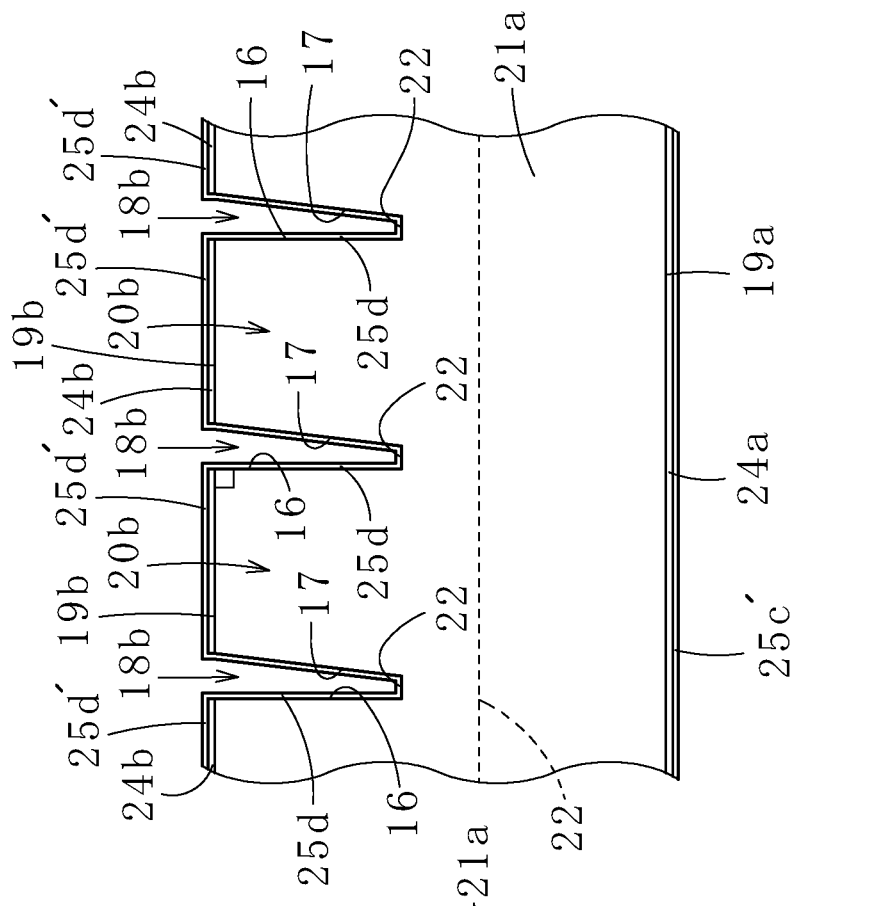
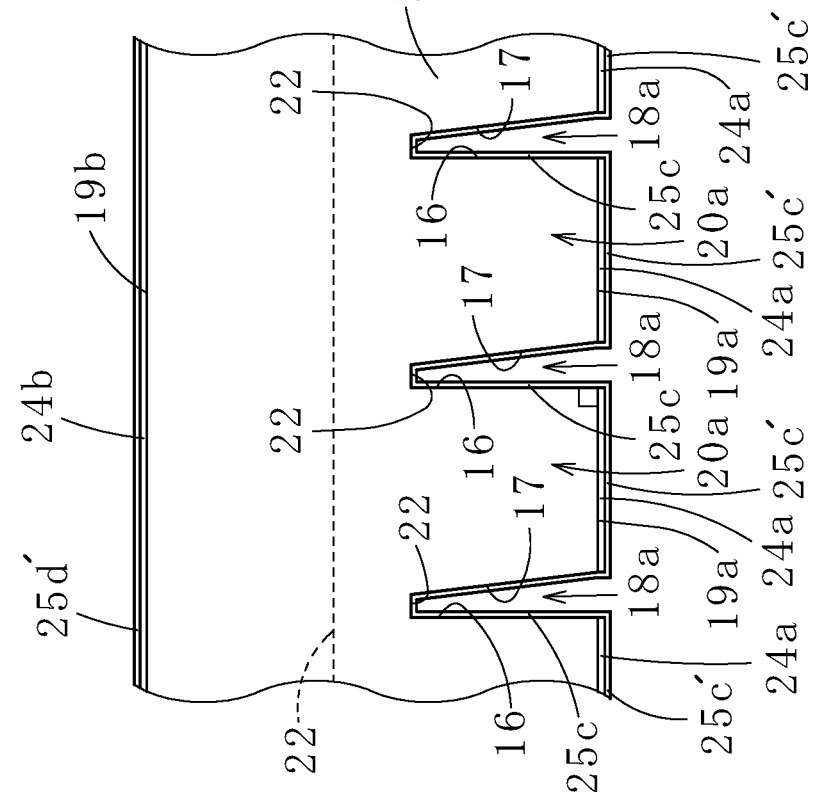
FIG. 12(A)
FIG. 12(B)

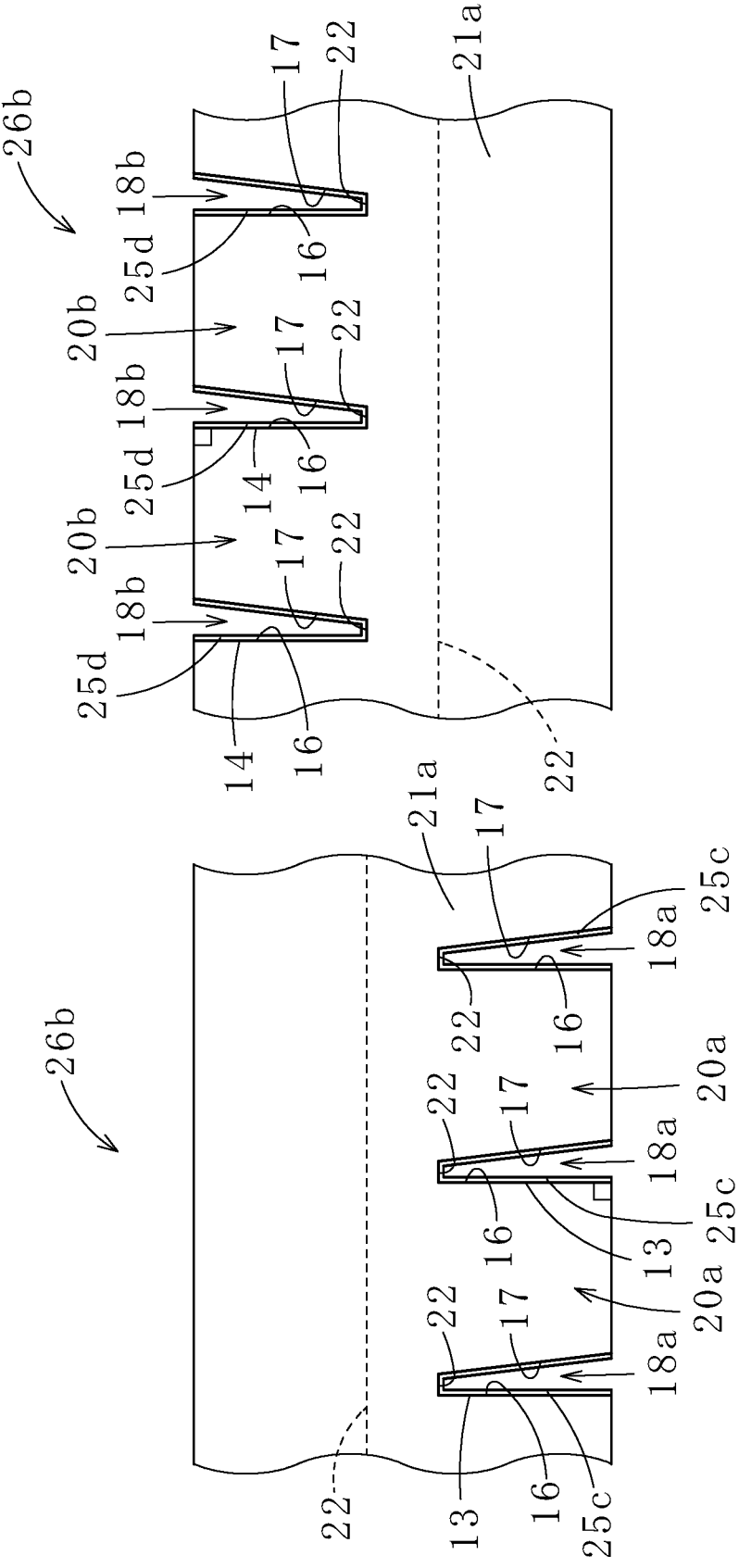

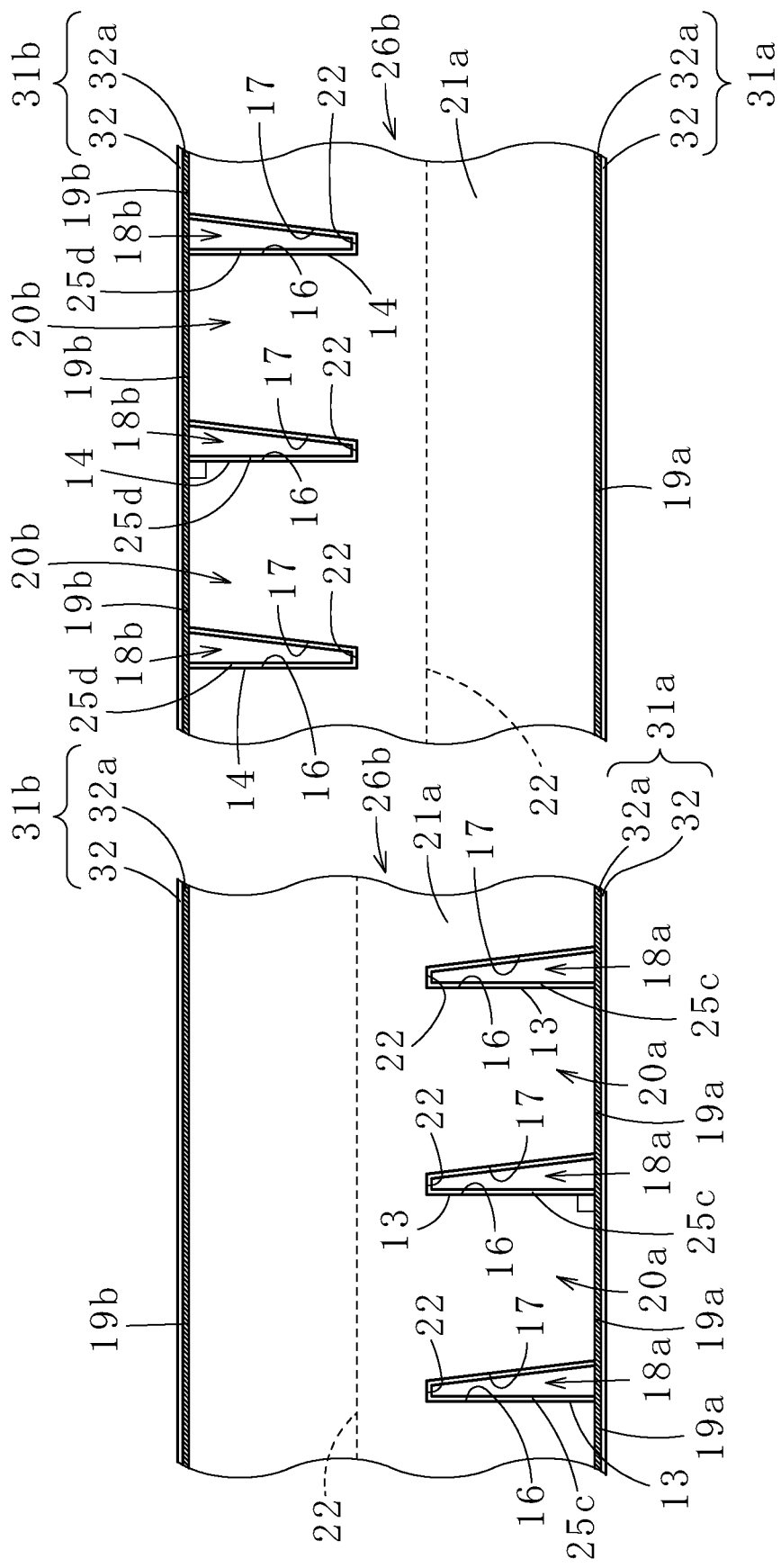

METHOD FOR MANUFACTURING AERIAL IMAGE FORMATION DEVICE, AND AERIAL IMAGE FORMATION DEVICE

TECHNICAL FIELD

The present invention relates to a method for manufacturing an aerial image formation device, and an aerial image formation device. In the aerial image formation device, a plurality of band-shaped first light reflecting surfaces (mirror surfaces) and a plurality of band-shaped second light reflecting surfaces (mirror surfaces) are disposed to be orthogonal to each other in a plan view. For example, the plurality of band-shaped first light reflecting surfaces (mirror surfaces) is disposed in parallel at predetermined intervals. The plurality of band-shaped second light reflecting surfaces (mirror surfaces) is disposed in parallel at predetermined intervals.

BACKGROUND ART

For example, a stereoscopic-image-forming device (optical-image-forming device) described in Patent Literature 1 has been known that uses light (scattered light) emitted from the surface of an object (target) to form a stereoscopic image (aerial image=real image) of the object in the air. This image-forming device comprises first and second light control panels formed by arranging a large number of band-shaped light reflecting surfaces, each including a metal reflecting surface, at constant pitch inside two transparent flat plates to cause the band-shaped light reflecting surfaces to be vertical to one surface sides of these transparent flat plates. The first and second light control panels are brought into close contact with the one surface sides of the first and second light control panels opposed to each other to cause the respective light reflecting surfaces of these first and second light control panels to be orthogonal to each other.

To manufacture each of the light control panels according to Patent Literature 1, it is, however, necessary to fabricate a laminate by laminating a large number of plate-shaped transparent synthetic resin plates or glass plates each having constant thickness in each of which metal reflecting surfaces are formed on one surface side to dispose the metal reflecting surface on one of the sides and cut out, from this laminate, a cutting surface that is formed to be vertical to each metal reflecting surface. This does not lead to favorable working efficiency or manufacturing efficiency.

Patent Literature 2 thus proposes a method for manufacturing each of the first and second light control panels by manufacturing, on the front side of a transparent plate material by press molding or the like, a molded preform in which grooves each having an inclined surface and a vertical surface and each having a triangular cross section are disposed in parallel and protruded strips each formed by the adjacent grooves and each having a triangular cross section are disposed in parallel, and selectively forming a mirror surface on only the vertical surface of each of the grooves.

CITATION LIST

Patent Literatures

Patent Literature 1: International Publication No. 2009/131128
Patent Literature 2: International Publication No. 2018/138940
Patent Literature 3: International Publication No. 2018/138932
Patent Literature 4: Japanese Patent Application Laid-Open Publication No. 2021-81451

SUMMARY OF INVENTION

Technical Problem

It is, however, not easy to selectively form a mirror surface on only the vertical surface of each of the grooves as in Patent Literature 2, and even sputtering, metal deposition, metal microparticle spraying, or ion beam irradiation on the vertical surface from the direction along the inclined surface with the inclined surface in shadow sometimes causes metal reflective films (metal coatings) each serving as a mirror surface to be formed at micro flat portions on the inclined surface and the bottom (corner portion) of the groove and further a micro flat portion at the top portion (corner portion) of each of the protruded strips. A portion of pieces of light emitted from a target and entering the image-forming device is then reflected by the metal reflective film formed in a region other than the vertical surface of the groove to decrease the amount of light that contributes to the formation of an image, raising a problem that an aerial image is made dark and unclear. In addition, when an observer observes an aerial image, a portion of pieces of light (sunlight, indoor illumination light, or the like) entering the image-forming device from the light exit surface side of the image-forming device is scattered or reflected by the metal reflective film formed in the region other than the vertical surface of the groove, thereby raising a problem that an aerial image is made whitish and the clearness and visual recognizability are lowered. To address this, Patent Literature 3 proposes that, after metal coatings are formed on the vertical surface and the inclined surface of a groove, the inclined surface be irradiated with laser light to remove the metal coating formed on the inclined surface. In addition, Patent Literature 4 proposes that unnecessary metal (metal coating) adhering to a micro flat portion at the top portion of a protruded strip be removed through a peeling process, a polishing process, or a dissolving process.

Patent Literature 3, however, forms a metal coating on an inclined surface on the assumption that the metal coating is to be removed. Many materials are used in vain and a manufacturing step is also complicated to increase the manufacturing cost. Patent Literature 3 has a problem about low mass productivity. In addition, Patent Literature 4 has a problem that it takes time to remove unnecessary metal because micro flat portions occupy small area, which leads to less contribution for the time to an improvement effect of making an aerial image clearer and leads to an increase in cost on the contrary. In addition, when a light reflecting surface (mirror surface) is formed by using the vertical surface of a groove having a triangular cross section as in Patent Literatures 2 to 4, the remaining groove prevents an aerial image from being formed because the difference between the refractive index of air present inside (space section) the groove and the refractive index of a transparent resin that is a base material of a light control panel causes light to be scattered, refracted, and dispersed at the interface (=the boundary or chiefly the inclined surface of the groove) between the air inside the groove and the transparent resin. Therefore, each of Patent Literatures 2 to 4 has to fill the inside of a groove with a transparent resin having a refractive index equivalent to the refractive index of a transparent resin that is a base material of a light control panel after forming a light reflecting surface on the vertical surface of the groove. This increases manufacturing steps and raises a problem about lowered mass productivity.

The present invention has been devised in view of such circumstances, and an object of the present invention is to provide a method for manufacturing an aerial image formation device and an aerial image formation device that can obtain a clear aerial image while having a simple manufacturing step, excellent mass productivity, and low manufacturing cost.

Solution to Problem

A method for manufacturing an aerial image formation device according to a first invention that achieves the above-described object is a method for manufacturing an aerial image formation device, the aerial image formation device being formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view. The method includes:
- a first step of molding a transparent resin to form a plate-shaped molding in which, on one surface side of the molding, (a) a plurality of first straight grooves, each having a triangular cross section or a trapezoidal cross section, each expanding on the one surface side of the molding, and each having one side surface serving as a vertical surface and another side surface serving as an inclined surface, is disposed in parallel at a predetermined interval and (b) a first protruded strip having a trapezoidal cross section and including a first band-shaped flat section on the one surface side of the molding is formed between the first straight grooves adjacent to each other, and, on another surface side of the molding, (c) a plurality of second straight grooves, each having a triangular cross section or a trapezoidal cross section, each expanding on the other surface side of the molding, and each having one side surface serving as a vertical surface and another side surface serving as an inclined surface, is disposed in parallel at a predetermined interval and (d) a second protruded strip having a trapezoidal cross section and including a second band-shaped flat section on the other surface side of the molding is formed between the second straight grooves adjacent to each other, the vertical surface of each of the first straight grooves and the vertical surface of each of the second straight grooves being disposed to be orthogonal to each other in a plan view;
- a second step of covering at least the vertical surfaces and the inclined surfaces of respective inner surfaces of the first and second straight grooves of the molding with light reflecting materials to produce an intermediate; and
- a third step of forming a first anti-reflection layer that covers the first light reflecting material in a region overlapping with each of the first straight grooves in a plan view from one surface side of the intermediate and forming a second anti-reflection layer that covers the second light reflecting material in a region overlapping with each of the second straight grooves in a plan view from another surface side of the intermediate to manufacture an aerial image formation device in which a surface of the first light reflecting material covering the vertical surface of each of the first straight grooves serves as the first light reflecting surface, the surface being on a side closer to the vertical surface of each of the first straight grooves, and a surface of the second light reflecting material covering the vertical surface of each of the second straight grooves serves as the second light reflecting surface, the surface being on a side closer to the vertical surface of each of the second straight grooves.

Here, the aerial image includes a planar image (two-dimensional image) and a stereoscopic image (three-dimensional image). If a target is, for example, an image displayed on image display means such as a display, a planar image (two-dimensional image) that is a real image thereof is formed as an aerial image. If a target is any of various stereoscopic targets, a stereoscopic image (three-dimensional image) that is a real image thereof is formed as an aerial image (the same applies to second to fourth inventions).

In the method for manufacturing the aerial image formation device according to the first invention, in the second step, respective insides of the first and second straight grooves of the molding may be filled with the first and second light reflecting materials to cover the respective inner surfaces of the first and second straight grooves including the vertical surfaces and the inclined surfaces with the first and second light reflecting materials, and in the third step, the first and second anti-reflection layers may be formed on a surface, which is on the one surface side of the intermediate, of the first light reflecting material with which each of the first straight grooves is filled and a surface, which is on the other surface side of the intermediate, of the second light reflecting material with which each of the second straight grooves is filled.

In the method for manufacturing the aerial image formation device according to the first invention, it is preferable that, in the second step, after peelable first and second covering layers are formed on at least respective surfaces of the first and second band-shaped flat sections of the molding, at least the respective vertical surfaces and the respective inclined surfaces of the first and second straight grooves are covered with the first and second light reflecting materials to produce the intermediate, and in the third step, after the first and second light reflecting materials that cover at least the respective inner surfaces of the first and second straight grooves of the intermediate are covered with first and second anti-reflection materials, the first and second covering layers respectively formed on the first and second band-shaped flat sections, unnecessary first and second light reflecting materials respectively adhering onto the first and second covering layers, and unnecessary first and second anti-reflection materials respectively adhering onto the first and second covering layers are removed to form the first and second anti-reflection layers.

In the method for manufacturing the aerial image formation device according to the first invention, in the third step, a first cover material having a non-light-transmissive property and covering each of the first straight grooves and each of the first band-shaped flat sections may be disposed on the one surface side of the intermediate, a second cover material having a non-light-transmissive property and covering each of the second straight grooves and each of the second band-shaped flat sections may be disposed on the other surface side of the intermediate, and a region of the first cover material overlapping with each of the first band-shaped flat sections and a region of the second cover material overlapping with each of the second band-shaped flat sections may be pressurized to be respectively bonded to the first and second band-shaped flat sections and made transparent to form the first and second anti-reflection layers respectively in a region of the first cover material overlapping with each of the first straight grooves and a region of the second cover material overlapping with each of the second straight grooves.

In the method for manufacturing the aerial image formation device according to the first invention, it is preferable that, in the second step before the third step, after peelable first and second covering layers are formed on at least respective surfaces of the first and second band-shaped flat sections of the molding, and at least the respective vertical surfaces and the respective inclined surfaces of the first and second straight grooves are covered with the first and second light reflecting materials, the first and second covering layers respectively formed on the first and second band-shaped flat sections and unnecessary first and second light reflecting materials respectively adhering onto the first and second covering layers are removed to produce the intermediate.

A method for manufacturing an aerial image formation device according to a second invention that achieves the above-described object is a method for manufacturing an aerial image formation device, the aerial image formation device being formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view. The method includes:
- a first step of molding a transparent resin to produce a plate-shaped molding in which, on one surface side of the molding, (a) a plurality of straight grooves, each having a triangular cross section or a trapezoidal cross section, each expanding on the one surface side of the molding, and each having one side surface serving as a vertical surface and another side surface serving as an inclined surface, is disposed in parallel at a predetermined interval and (b) a protruded strip having a trapezoidal cross section and including a band-shaped flat section on the one surface side of the molding is formed between the straight grooves adjacent to each other;
- a second step of covering at least the vertical surface and the inclined surface of an inner surface of each of the straight grooves of the molding with a light reflecting material to produce an intermediate;
- a third step of forming an anti-reflection layer that covers the light reflecting material in a region overlapping with each of the straight grooves in a plan view from one surface side of the intermediate to manufacture a light control panel; and
- a fourth step of using the two light control panels and disposing the two light control panels with one surface side or another surface side of the one of the light control panels and one surface side or another surface side of the other of the light control panels opposed to each other to cause the vertical surface of each of the straight grooves of the one of the light control panels and the vertical surface of each of the straight grooves of the other of the light control panels to be orthogonal to each other in a plan view to manufacture an aerial image formation device in which a surface of the light reflecting material that covers the vertical surface of each of the straight grooves of the one of the light control panels serves as the first light reflecting surface, the surface being on a side closer to the vertical surface of each of the straight grooves of the one of the light control panels, and a surface of the light reflecting material that covers the vertical surface of each of the straight grooves of the other of the light control panels serves as the second light reflecting surface, the surface being on a side closer to the vertical surface of each of the straight grooves of the other of the light control panels.

In the method for manufacturing the aerial image formation device according to the second invention, in the second step, inside of each of the straight grooves of the molding may be filled with the light reflecting material to cover the inner surface of each of the straight grooves including the vertical surface and the inclined surface with the light reflecting material, and in the third step, the anti-reflection layer may be formed on a surface, which is on the one surface side of the intermediate, of the light reflecting material with which each of the straight grooves is filled.

In the method for manufacturing the aerial image formation device according to the second invention, it is preferable that, in the second step, after a peelable covering layer is formed on at least a surface of each of the band-shaped flat sections of the molding, at least the vertical surface and the inclined surface of each of the straight grooves are covered with the light reflecting material to produce the intermediate, and in the third step, after the light reflecting material that covers at least the inner surface of each of the straight grooves of the intermediate is covered with an anti-reflection material, the covering layer formed on each of the band-shaped flat sections, an unnecessary light reflecting material adhering onto each of the covering layers, and an unnecessary anti-reflection material adhering onto each of the covering layers are removed to form the anti-reflection layer.

In the method for manufacturing the aerial image formation device according to the second invention, in the third step, a cover material having a non-light-transmissive property and covering each of the straight grooves and each of the band-shaped flat sections may be disposed on the one surface side of the intermediate, and a region of the cover material overlapping with each of the band-shaped flat sections may be pressurized to be bonded to each of the band-shaped flat sections and made transparent to form the anti-reflection layer in a region of the cover material overlapping with each of the straight grooves.

In the method for manufacturing the aerial image formation device according to the second invention, it is preferable that, in the second step before the third step, after a peelable covering layer is formed on at least a surface of each of the band-shaped flat sections of the molding and at least the vertical surface and the inclined surface of each of the straight grooves are covered with the light reflecting material, the covering layer formed on each of the band-shaped flat sections and an unnecessary light reflecting material adhering onto each of the covering layers are removed to produce the intermediate.

An aerial image formation device according to a third invention that achieves the above-described object is an aerial image formation device that is formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view. The aerial image formation device includes: a molding; first and second light reflecting materials; and first and second anti-reflection layers. The molding is produced by using a transparent resin. The molding includes, on one surface side thereof, a plurality of first straight grooves disposed in parallel at a predetermined interval and a first protruded strip formed between the first straight grooves adjacent to each other, the plurality of first straight grooves each having a triangular cross section or a trapezoidal cross section, each expanding on the one surface side of the molding, and each having one side surface serving as a vertical surface and another side surface serving as an inclined surface, the first protruded strip having a trapezoidal cross section and including a first band-shaped flat section on the one surface side of the molding. The molding includes, on another side surface thereof, a plurality of second straight grooves disposed in parallel at a predetermined interval and a second protruded strip formed between the second straight grooves adjacent to each other, the plurality of second straight grooves each having a triangular cross section or a trapezoidal cross section, each expanding on the other surface side of the molding, and each having one side surface serving as a vertical surface and another side surface serving as an inclined surface, the second protruded strip having a trapezoidal cross section and including a second band-shaped flat section on the other surface side of the molding. The first and second light reflecting materials cover at least the vertical surfaces and the inclined surfaces of respective inner surfaces of the first and second straight grooves of the molding. The first and second anti-reflection layers cover the first and second light reflecting materials respectively in a region overlapping with each of the first straight grooves in a plan view from the one surface side of the molding and a region overlapping with each of the second straight grooves in a plan view from the other surface side of the molding. The vertical surface of each of the first straight grooves and the vertical surface of each of the second straight grooves are disposed to be orthogonal to each other in a plan view, a surface of the first light reflecting material covering the vertical surface of each of the first straight grooves serves as the first light reflecting surface, the surface being on a side closer to the vertical surface of each of the first straight grooves, and a surface of the second light reflecting material covering each of the second straight grooves serves as the second light reflecting surface, the surface being on a side closer to the vertical surface of each of the second straight grooves.

In the aerial image formation device according to the third invention, it is preferable that the aerial image formation device includes a first cover material and a second cover material, the first cover material covering each of the first straight grooves and each of the first band-shaped flat sections on the one surface side of the molding, the second cover material covering each of the second straight grooves and each of the second band-shaped flat sections on the other surface side of the molding, first and second light-transmissive layers are respectively formed in a region of the first cover material overlapping with each of the first band-shaped flat sections and a region of the second cover material overlapping with each of the second band-shaped flat sections, and the first and second anti-reflection layers are respectively formed in a region of the first cover material overlapping each of the first straight grooves and a region of the second cover material overlapping with each of the second straight grooves.

An aerial image formation device according to a fourth invention that achieves the above-described object is an aerial image formation device that is formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view. The aerial image formation device includes two light control panels each including a molding, a light reflecting material, and an anti-reflection layer, the molding being produced by using a transparent resin, the molding including, on one surface side thereof, a plurality of straight grooves disposed in parallel at a predetermined interval and a protruded strip formed between the straight grooves adjacent to each other, the plurality of straight grooves each having a triangular cross section or a trapezoidal cross section, each expanding on the one surface side of the molding, and each having one side surface serving as a vertical surface and another side surface serving as an inclined surface, the protruded strip having a trapezoidal cross section and including a band-shaped flat section on the one surface side of the molding, the light reflecting material covering at least the vertical surface and the inclined surface of an inner surface of each of the straight grooves of the molding, the anti-reflection layer covering the light reflecting material in a region overlapping with each of the straight grooves in a plan view from the one surface side of the molding. The two light control panels are disposed with one surface side or another surface side of one of the light control panels and one surface side or another surface side of the other of the light control panels opposed to each other to cause the vertical surface of each of the straight grooves of the one of the light control panels and the vertical surface of each of the straight grooves of the other of the light control panels to be orthogonal to each other in a plan view, a surface of the light reflecting material that covers the vertical surface of each of the straight grooves of the one of the light control panels serves as the first light reflecting surface, the surface being on a side closer to the vertical surface of each of the straight grooves of the one of the light control panels, and a surface of the light reflecting material that covers the vertical surface of each of the straight grooves of the other of the light control panels serves as the second light reflecting surface, the surface being on a side closer to the vertical surface of each of the straight grooves of the other of the light control panels.

In the aerial image formation device according to the fourth invention, it is preferable that the aerial image formation device includes cover materials that cover the respective straight grooves and the respective band-shaped flat sections on the one surface sides of the respective light control panels, and light-transmissive layers are each formed in a region of each of the cover materials overlapping with each of the band-shaped flat sections and the anti-reflection layers are each formed in a region of each of the cover materials overlapping with each of the straight grooves.

Advantageous Effects of Invention

In the method for manufacturing the aerial image formation device according to the first invention, when the respective inner surfaces of the first and second straight grooves of the molding are covered with the light reflecting materials, it is unnecessary to take countermeasures to prevent regions other than the vertical surfaces of the respective inner surfaces of the first and second straight grooves from being covered with the light reflecting materials and unnecessary to remove the light reflecting materials that cover the regions other than the vertical surfaces of the inner surfaces of the respective straight grooves. This makes it possible to simplify a manufacturing step. In addition, in the method for manufacturing the aerial image formation device according to the second invention, when the inner surface of each of the straight grooves of the molding is covered with the light reflecting material, it is unnecessary to take countermeasures to prevent a region other than the vertical surface of the inner surface of each of the straight grooves from being covered with the light reflecting material and unnecessary to remove the light reflecting material that covers the region other than the vertical surface of the inner surface of each of the straight grooves. This makes it possible to simplify a manufacturing step.

In the aerial image formation device according to the third invention, the first and second anti-reflection layers are formed to overlap with the first and second light reflecting materials that cover at least the respective vertical surfaces and the respective inclined surfaces of the first and second straight grooves. This causes pieces of light (sunlight, indoor illumination light, or the like) each toward the first or second straight groove from the light exit surface side of the aerial image formation device to be absorbed or dispersed by the first or second anti-reflection layer when an observer observes an aerial image. The light reflecting material reflects (regular reflection or mirror reflection) no light on the inner surface of the first or second straight groove. The aerial image is excellent in clearness and visual recognizability. In addition, in the aerial image formation device according to the fourth invention, the anti-reflection layer is formed to overlap with the light reflecting material that covers at least the vertical surface and the inclined surface of each of the straight grooves. This causes pieces of light (sunlight, indoor illumination light, or the like) toward each of the straight groove from the light exit surface side of the aerial image formation device to be absorbed or dispersed by the anti-reflection layer when an observer observes an aerial image. The light reflecting material reflects (regular reflection or mirror reflection) no light on the inner surface of each of the straight grooves. The aerial image is excellent in clearness and visual recognizability.

BRIEF DESCRIPTION OF DRAWINGS

FIGS. 8(A) and 8(B) are respectively illustrates a sectional front view and a sectional side view of a first step of the method for manufacturing the aerial image formation device.

FIGS. 9(A) and 9(B) are respectively a sectional front view and a sectional side view of a second step of the method for manufacturing the aerial image formation device.

FIGS. 10(A) and 10(B) are respectively a sectional front view and a sectional side view of a third step of the method for manufacturing the aerial image formation device.

FIGS. 11(A) and 11(B) are respectively a sectional front view and a sectional side view of an aerial image formation device manufactured in a method for manufacturing an aerial image formation device according to a third embodiment of the present invention.

FIGS. 12(A) and 12(B) are respectively a sectional front view and a sectional side view of a second step of the method for manufacturing the aerial image formation device.

FIGS. 13(A) and 13(B) are respectively a sectional front view and a sectional side view of an intermediate manufactured in the second step of the method for manufacturing the aerial image formation device.

FIGS. 14(A) and 14(B) are respectively a sectional front view and a sectional side view of a third step of the method for manufacturing the aerial image formation device.

DESCRIPTION OF EMBODIMENTS

A method for manufacturing an aerial image formation device, and an aerial image formation device according to a first embodiment of the present invention will be described with reference to the drawings.

Figure 1:
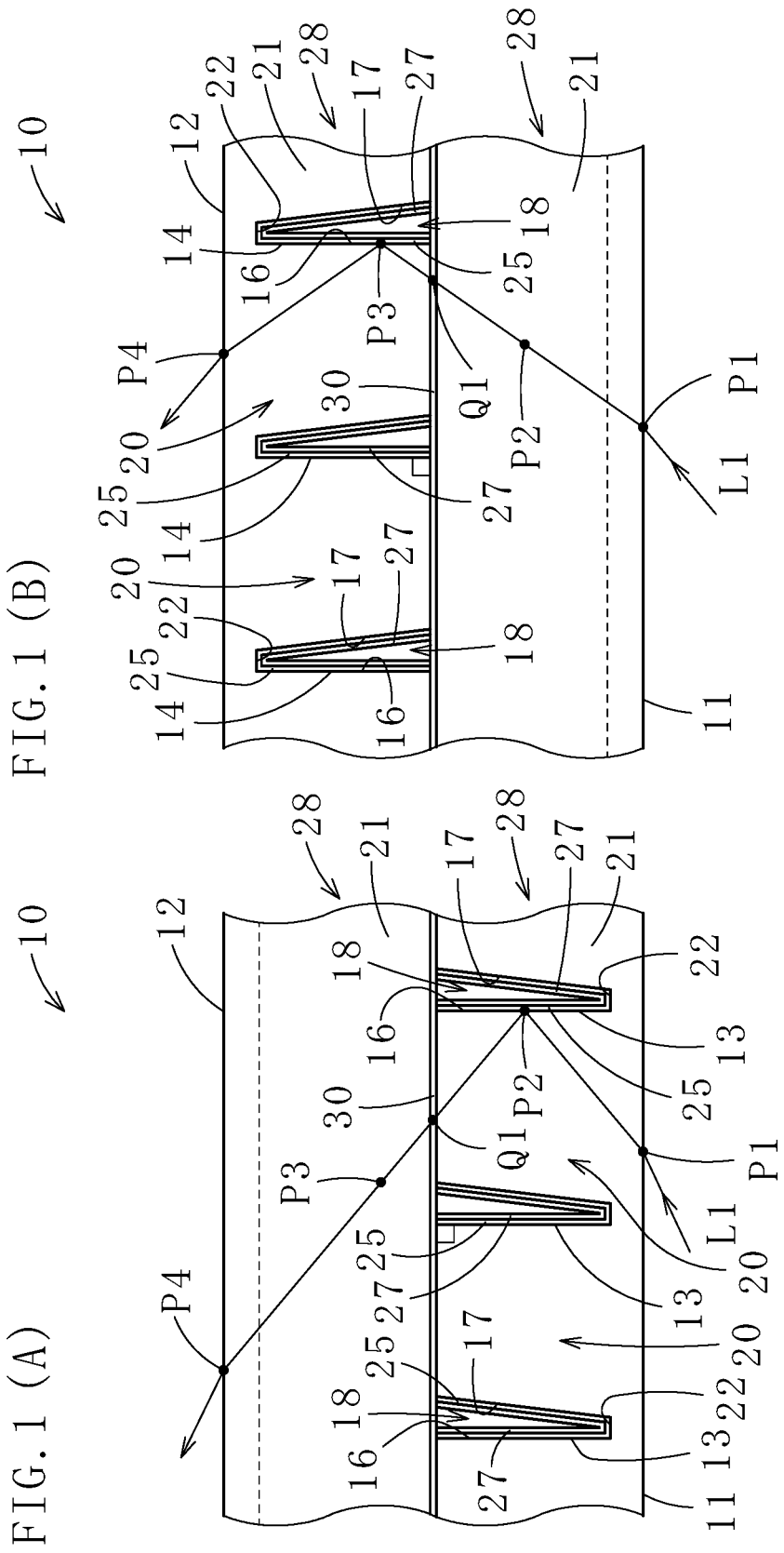
FIGS. 1(A) and 1(B) are respectively a sectional front view and a sectional side view of an aerial image formation device manufactured in a method for manufacturing an aerial image formation device according to a first embodiment of the present invention.

As illustrated in FIGS. 1(A) and (B), an aerial image formation device 10 manufactured in the method for manufacturing the aerial image formation device according to the first embodiment of the present invention is formed to have the shape of a flat plate having a light entrance surface 11 and a light exit surface 12. The light entrance surface 11 and the light exit surface 12 are disposed in parallel. The aerial image formation device 10 has a plurality of first light reflecting surfaces 13 and a plurality of second light reflecting surfaces 14. The plurality of first light reflecting surfaces 13 is each formed at right angle to the light entrance surface 11. The plurality of first light reflecting surfaces 13 is disposed in parallel at predetermined intervals. The plurality of second light reflecting surfaces 14 is each formed at right angle to the light exit surface 12. The plurality of second light reflecting surfaces 14 is disposed in parallel at predetermined intervals. The first light reflecting surfaces 13 and the second light reflecting surfaces 14 are disposed to be orthogonal to each other in a plan view.

Figure 2:
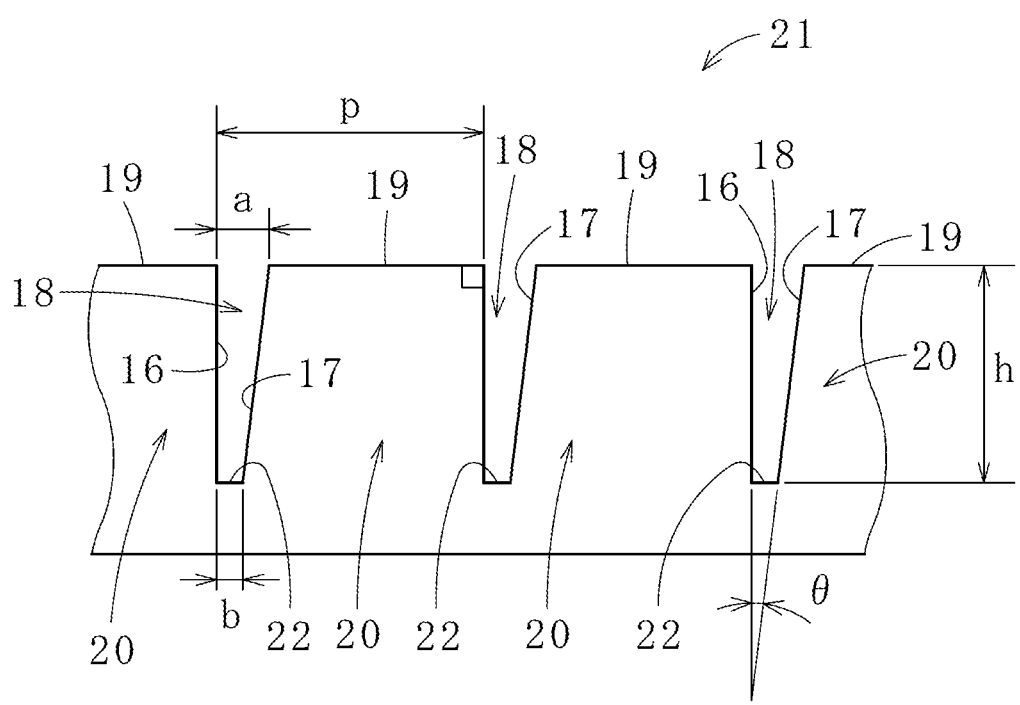
FIG. 2 is a cross-sectional view illustrating a first step of the method for manufacturing the aerial image formation device.

To manufacture this aerial image formation device 10, a transparent resin is molded (e.g., injection molding, press molding, roll molding, or the like) to produce a plate-shaped molding 21 in which a plurality of straight grooves 18 is disposed in parallel at predetermined intervals and a protruded strip 20 is formed between the adjacent straight grooves 18 on one surface side as illustrated in FIG. 2. The plurality of straight grooves 18 each has a trapezoidal cross section. The plurality of straight grooves 18 each expands on one surface side with one of the side surfaces serving as a vertical surface 16 and the other side surface serving as an inclined surface 17. The protruded strip 20 has a trapezoidal cross section. The protruded strip 20 includes a band-shaped flat section 19 on one surface side. When a denotes the width (the length of the upper base of the trapezoidal cross section) of the opening of the straight groove 18 on the one surface side, b denotes the width (the length of the lower base of the trapezoidal cross section) of a bottom surface 22 of the straight groove 18, h denotes the depth (the height of the trapezoidal cross section) of the straight groove 18, and p denotes the pitch (=the pitch of the protruded strips) of the straight grooves 18, a is preferably about 1.5 to 2 times greater than b, p is preferably about 3 to 5 times greater than a, and h is preferably about 1 to 2 times greater than b. For example, when b=40 μm, p=250 to 300 μm, and h=300 to 400 μm hold in the case of a=70 μm, the relationship described above is satisfied. This is, however, not limitative. It is to be noted that the pitch p does not have to be uniform (even intervals) over all the regions, but may also be non-uniform (intervals varying depending on places). In addition, an inclination angle (the angle formed between the vertical surface 16 and the inclined surface 17) θ of the inclined surface 17 of the straight groove 18 to the vertical surface 16 is, for example, about 1 to 10 degrees. The inclination angle θ is, however, selected as appropriate by taking the demolding efficiency of the molding 21 into consideration.

It is to be noted that the straight groove 18 has a trapezoidal cross section in the present embodiment, but the dimensions of the bottom surface 22 do not have to be strictly managed because the bottom surface 22 is not an essential component for the aerial image formation device 10. The straight groove may be formed to have a triangular cross section that expands on the one surface side with one of the side surfaces serving as a vertical surface and the other side surface serving as an inclined surface (the same applies to the following embodiments).

To produce this molding 21, a thermoplastic resin is favorably used that has a relatively high melting point and has high transparency. Specifically, for example, ZEONEX (ZEONEX®: cycloolefin polymer whose glass transition temperature Tg is equal to 100 to 160° C. and refractive index η1 is equal to 1.535) is used, but it is possible to use, for example, a thermoplastic resin such as polymethyl methacrylate (acrylic-based resin), an amorphous fluorine resin, PMMA, polycarbonate for optical use, fluorene-based polyester, or polyether sulfone in addition thereto. It is to be noted that annealing treatment is preferably performed on this molding 21 to remove residual stress or the like after molding (the above is a first step).

Figure 3:
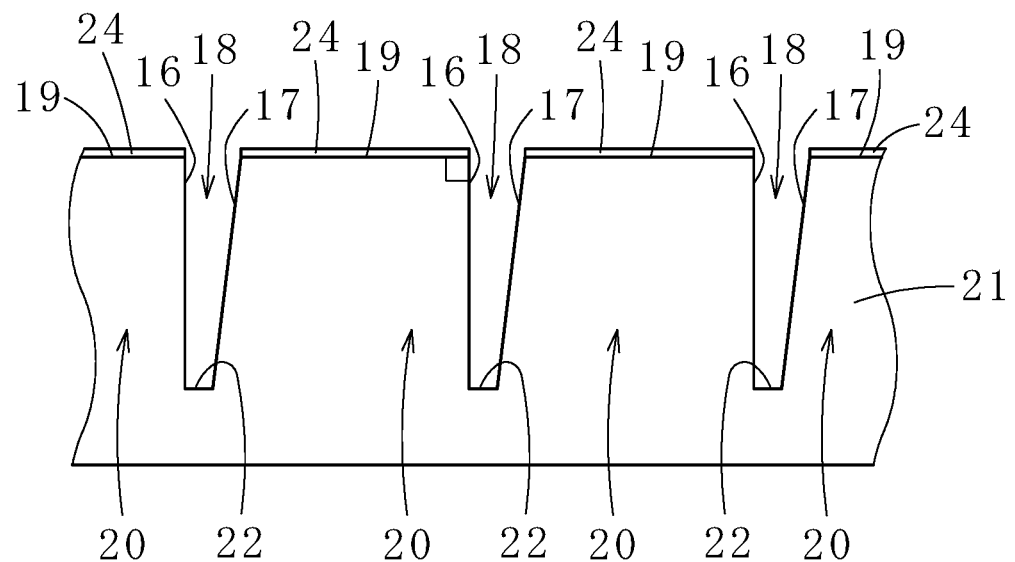
FIGS. 3(A) and 3(B) are cross-sectional views illustrating a second step of the method for manufacturing the aerial image formation device.
Figure 3:
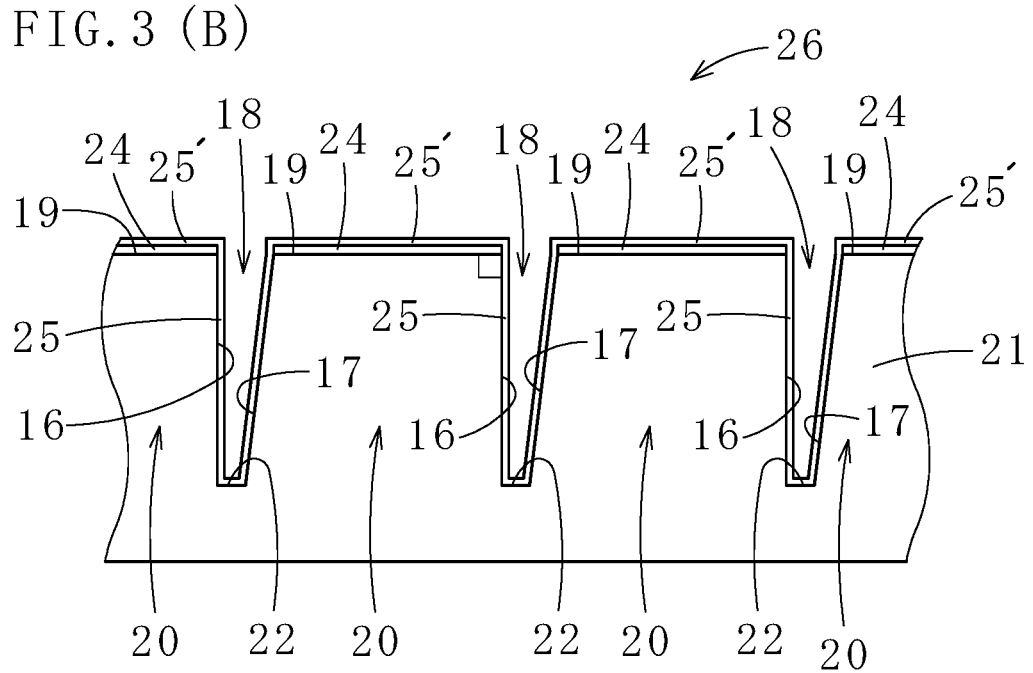

Next, as illustrated in FIG. 3(A), peelable covering layers 24 are formed on the surfaces of the respective band-shaped flat sections 19 of the molding 21. The covering layers 24 are each formed, for example, by applying or transferring a liquid or gel covering material to the surface of each of the band-shaped flat sections 19 with a brush, a roller, a stamp, or the like and solidifying the liquid or gel covering material, or pushing a sticky covering film such as a film or a sheet formed on the surface of the base material against the surface of each of the band-shaped flat sections 19 and transferring the sticky covering film to the surface of the band-shaped flat section 19. For example, when a liquid covering material jets out from a spray or the like to form a covering layer, the liquid covering material jets out from the direction vertical to each of the band-shaped flat sections. This makes it possible to prevent the covering material from adhering to the inner surface (the vertical surface in particular) of the straight groove.

After that, as illustrated in FIG. 3(B), the inner surface (at least the vertical surface 16 and the inclined surface 17) of each of the straight grooves 18 of the molding 21 is covered with a light reflecting material 25 to produce an intermediate 26. It is sufficient if at least the vertical surface 16 and the inclined surface 17 are covered with the light reflecting material 25 as the inner surface of the straight groove 18. The bottom surface 22 may be covered with the light reflecting material 25 or not (the vertical surface and the inclined surface are naturally covered with the light reflecting material when the straight groove is formed to have a triangular cross section).

It is sufficient if the light reflecting material 25 regularly reflects (mirror reflection=uniform diffuse reflection) light on the surface thereof. The light reflecting material 25 covers the inner surface of each of the straight grooves 18 in a method such as sputtering, metal deposition, metal microparticle spraying, ion beam irradiation, metal paste application, or plating by using, for example, metal such as aluminum as a raw material. An unnecessary light reflecting material 25' adhering onto the covering layer 24 covering each of the band-shaped flat sections 19 is removed as an adhering object in a later step. This eliminates the necessity to take special countermeasures to prevent a light reflecting material from adhering to the band-shaped flat section 19, simplifying a work step. In the present embodiment, the unnecessary light reflecting material 25' adheres to the whole surface of the covering layer 24, but the adhesion amount and adhesion range of unnecessary light reflecting materials vary depending on the type of light reflecting materials or the like. An unnecessary light reflecting material adheres only to a portion of the surface of the covering layer 24 in some cases. To reduce light reflecting materials to be used in vain, as small an amount of light reflecting materials as possible are preferable that adhere onto the covering layer. If it is possible to make a light reflecting material selectively adhere only to the inner surface of the straight groove, a step of forming a covering layer may be omitted. (The above is a second step).

Figure 4:
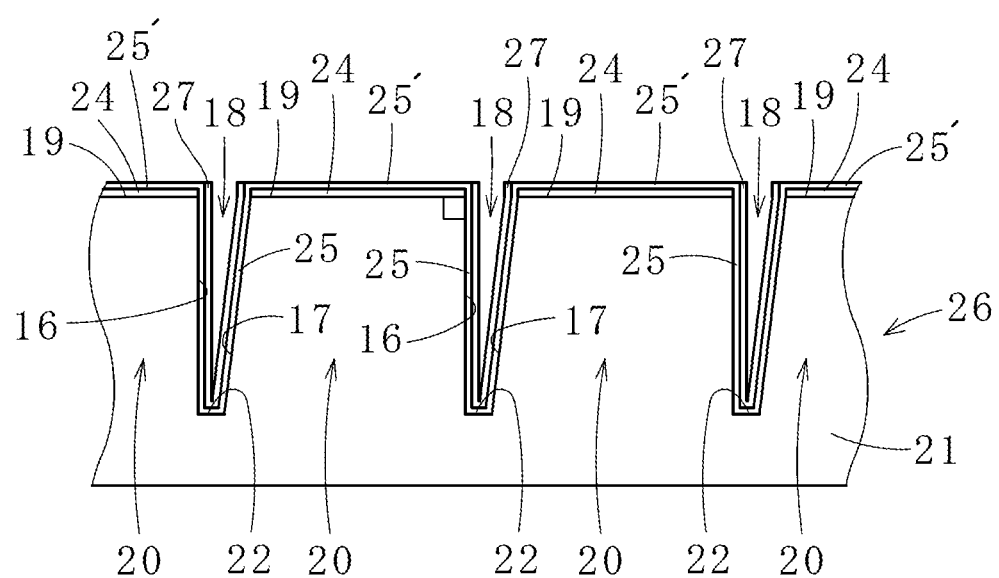
FIG. 4 is a cross-sectional view illustrating a third step of the method for manufacturing the aerial image formation device.

Next, as illustrated in FIG. 4, an anti-reflection layer 27 is formed that covers the inner surface of each of the straight grooves 18 of the intermediate 26. The inner surface includes the light reflecting material 25. The portion of the inner surface of each straight groove 18 that has been covered with the light reflecting material 25 before is thus covered with the anti-reflection layer 27 with the light reflecting material 25 below. If there is a portion that has not been covered with the light reflecting material 25, that portion is directly covered with the anti-reflection layer 27. It is sufficient if the anti-reflection layer 27 is capable of blocking light entering the inside of each straight groove 18 from the outside to prevent the light from reaching the light reflecting material (has a non-light-transmissive property), and absorbing or diffusing the light to prevent the reflection of the light (regular reflection or mirror reflection) (has a light absorbing property or a light diffusing property) when the aerial image formation device 10 is used. For example, an anti-reflection layer 27 formed by spraying or applying a liquid anti-reflection material such as opaque paint (preferably black) having a non-light-transmissive property and a light absorbing property to the inside of each straight groove 18 and drying the liquid anti-reflection material is favorably used as this anti-reflection layer 27, but this is not limitative. It is to be noted that a liquid anti-reflection material such as opaque paint that adheres onto the band-shaped flat section (including the top of the covering layer and the top of the light reflecting material) may be removed by using a solvent (e.g., water).

It is preferable to form the anti-reflection layer 27 in the region overlapping with each of the straight grooves 18 of the intermediate 26 on the one surface side in a plan view in the first place. In other words, it is preferable to form the anti-reflection layer 27 to cover only the inner surface of each straight groove 18 with the light reflecting material 25. However, when the covering layer 24 is formed on the surface of each of the band-shaped flat sections 19 as in the present embodiment, any unnecessary anti-reflection material (not illustrated) adhering onto the covering layer 24 (onto the surface of the unnecessary light reflecting material 25' adhering to the covering layer 24 here) when the anti-reflection layer is formed is removed as an adhering object on the covering layer 24 with an adhesive tape or the like in a later step along with the unnecessary light reflecting material 25'. When the adhesion between the covering layer and the band-shaped flat section (molding) is smaller than the adhesion between the covering layer and the light reflecting material at this time, the unnecessary light reflecting material and the unnecessary anti-reflection material on the covering layer are removed (peeled off) along with the covering layer. When the adhesion between the covering layer and the band-shaped flat section (molding) then is greater than the adhesion between the covering layer and the light reflecting material and a portion or the whole of the covering layer is left unremoved (not peeled off), this is separately removed (peeled off). It is to be noted that, when there is a region on the surface of the covering layer to which no unnecessary light reflecting material adheres, the unnecessary anti-reflection material directly adheres to the covering layer. Even in this case, the unnecessary anti-reflection material is, however, removed as an adhering object on the covering layer.

Figure 5:
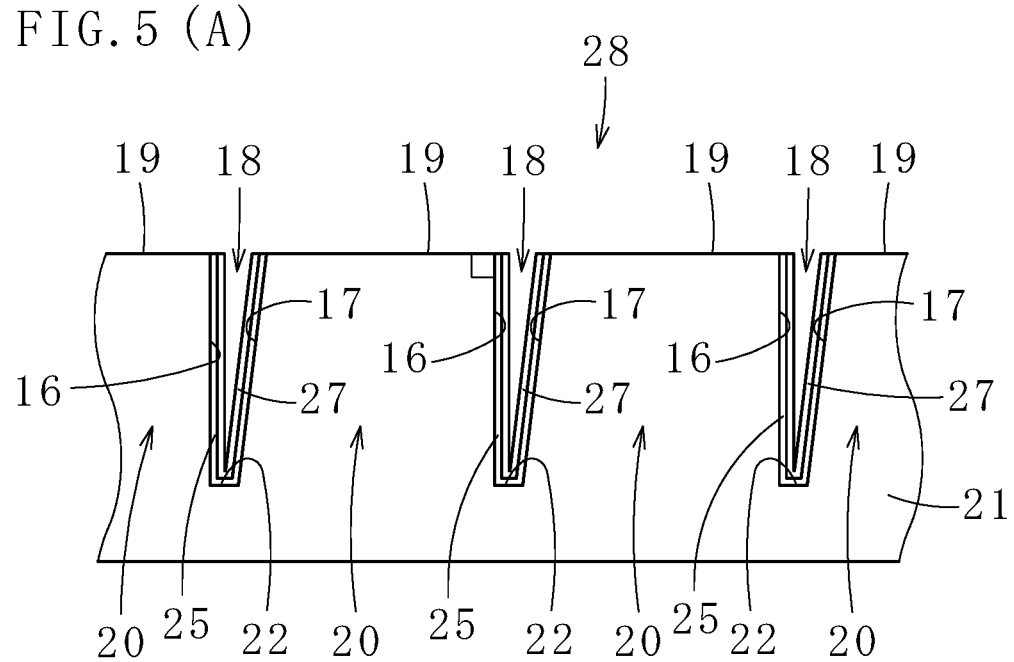
FIGS. 5(A) and 5(B) are respectively a cross-sectional view and a plan view of a light control panel manufactured in the third step of the method for manufacturing the aerial image formation device.
Figure 5:
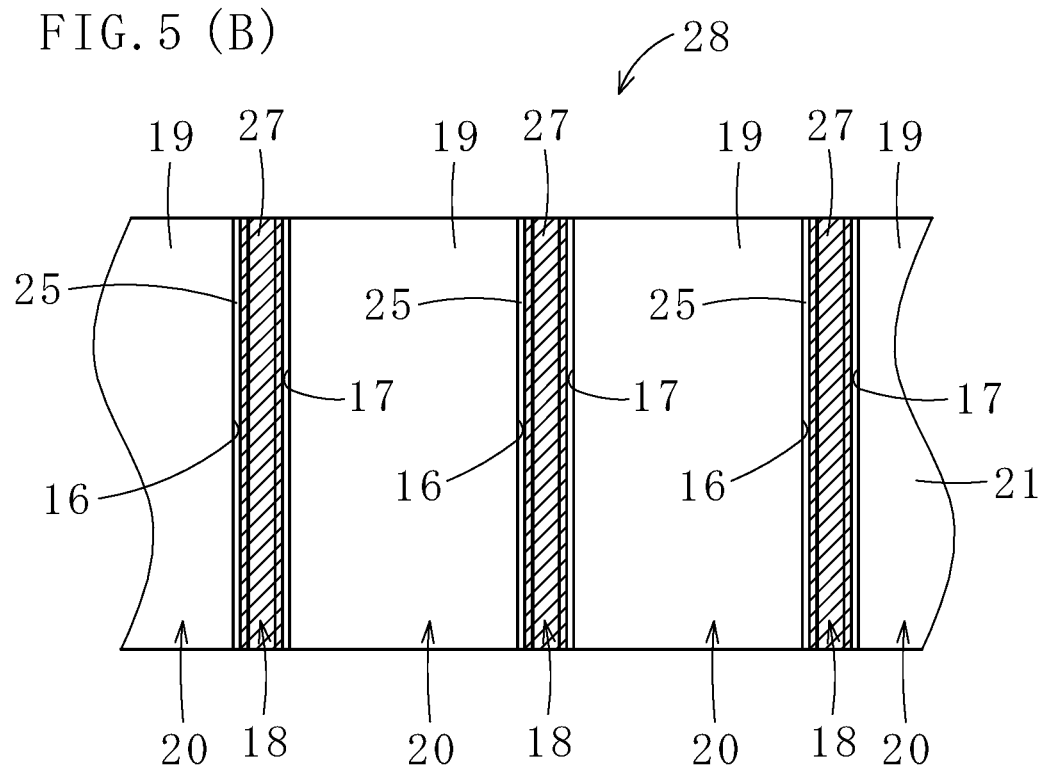

After the anti-reflection layer 27 is formed, each of the covering layers 24 and the adhering objects (the unnecessary light reflecting material and the unnecessary anti-reflection material) that adhere onto each of the covering layers 24 are removed. This forms the anti-reflection layer 27 that covers only the inner surface of each of the straight grooves 18 including the light reflecting material 25 to manufacture a light control panel 28 as illustrated in FIG. 5(A). In a plan view of this light control panel 28, the anti-reflection layer 27 that covers the light reflecting material 25 is formed in the region (hatched section) overlapping with each straight groove 18 on the one surface side in the plan view as illustrated in FIG. 5(B). It is to be noted that the anti-reflection layer may be formed by filling the inside (space section) of each straight groove with a gel anti-reflection material (e.g., a semi-molten synthetic resin colored black) and solidifying the anti-reflection material (the above is a third step).

Next, as illustrated in FIGS. 1(A) and (B), the two light control panels 28 are used and disposed with one surface side of one (lower one here) of the light control panels 28 and one surface side of the other (upper one here) of the light control panels 28 opposed to each other to cause the vertical surface 16 of each of the straight grooves 18 of the one of the light control panels 28 and the vertical surface 16 of each of the straight grooves 18 of the other of the light control panels 28 to be orthogonal to each other in a plan view. Here, the one surface side of the one of the light control panels 28 and the one surface side of the other of the light control panels 28 are bonded together and integrated with a transparent adhesive layer 30 interposed in between.

The transparent adhesive layer 30 is formed by using a transparent adhesive having high transparency and a refractive index $\eta 2$ equivalent to the refractive index $\eta 1$ of the transparent resin used to produce the molding 21. When ZEONEX described above is used to produce the molding 21, for example, a low-Tg epoxy-based adhesive for optical use that is adjusted to have the glass transition temperature Tg=49 to 67° C. and the refractive index $\eta 2$=1.45 to 1.57 is favorably used as the transparent adhesive, but this is not limited. A variety of transparent adhesives such as a light (UV) curing adhesive, a heat curing adhesive, or a two-part adhesive (cold setting adhesive) are additionally selected and used as appropriate in accordance with the material quality of the transparent resin used to produce the molding 21 (the above is a fourth step).

The steps described above offer the aerial image formation device 10 including the two light control panels 28 as illustrated in FIGS. 1(A) and (B). The two light control panels 28 each include the molding 21, the light reflecting material 25, and the anti-reflection layer 27. The molding 21 is produced by using a transparent resin. The molding 21 includes the plurality of straight grooves 18 and the protruded strip 20 on one surface side. The plurality of straight grooves 18 each expands on one surface side with one of side surfaces serving as the vertical surface 16 and the other side surface serving as the inclined surface 17. The plurality of straight grooves 18 is disposed in parallel at a predetermined interval. The plurality of straight grooves 18 each has a trapezoidal cross section. The protruded strip 20 is formed between the adjacent straight grooves 18. The protruded strip 20 includes the band-shaped flat section 19 on one surface side. The protruded strip 20 has a trapezoidal cross section. The light reflecting material 25 covers at least the vertical surface 16 and the inclined surface 17 of the inner surface of each of the straight grooves 18 of the molding 21. The anti-reflection layer 27 covers the light reflecting material 25 in a region overlapping with each of the straight grooves 18 in a plan view from the one surface side of the molding 21. One of the light control panels 28 and the other light control panel 28 are disposed with one surface side of the one of the light control panels 28 and one surface side of the other light control panel 28 opposed to each other to cause the vertical surface 16 of each of the straight grooves 18 of the one of the light control panels 28 and the vertical surface 16 of each of the straight grooves 18 of the other light control panel 28 to be orthogonal to each other in a plan view. A surface of the light reflecting material 25 closer to the vertical surface 16 that covers the vertical surface 16 of each of the straight grooves 18 of the one of the light control panels 28 serves as the first light reflecting surface 13, and a surface of the light reflecting material 25 closer to the vertical surface 16 that covers the vertical surface 16 of each of the straight grooves 18 of the other of the light control panels 28 serves as the second light reflecting surface 14.

The following describes an operation of the aerial image formation device 10.

In FIGS. 1(A) and (B), light L1 of pieces of light emitted from an unillustrated target enters the inside of the aerial image formation device 10 (lower light control panel 28) from P1 on the light entrance surface 11 (the surface of the lower light control panel 28 on the other side here). The light L1 is reflected at P2 on the first light reflecting surface 13 to enter the upper light control panel 28 from the lower light control panel 28. The light L1 is reflected at P3 on the second light reflecting surface 14 to be emitted to the air at P4 on the light exit surface 12 (the surface of the upper light control panel 28 on the other side here).

Here, the light L1 passes through the transparent adhesive layer 30 at Q1 after reflected at P2. However, the refractive index η1 of the transparent resin that is the base material (molding 21) of each of the light control panels 28 and the refractive index η2 of the transparent adhesive layer 30 are equivalent to each other. The transparent adhesive layer 30 has a small thickness (of about 5 to 50 μm). The refraction influence by the transparent adhesive layer 30 is thus extremely small and ignorable. In addition, no phenomenon such as total reflection or light dispersion occurs at the interface between the transparent resin that is the base material (molding 21) of the light control panel 28 and the transparent adhesive layer 30.

In this way, innumerable pieces of light emitted from the target and reflected once each on the first light reflecting surface 13 and the second light reflecting surface 14 of the aerial image formation device 10 form an image in the air. This offers an aerial image (not illustrated) that is a real image of the target at the position symmetrical to the target with respect to the aerial image formation device 10. It is to be noted that the light L1 is refracted at P1 on the light entrance surface 11 and P4 on the light exit surface 12. However, the transparent resins (moldings 21) that are the base materials of the upper and lower (the one and the other of) light control panels 28 are the same and uniform and all the pieces of light involved in the formation of the aerial image are refracted on the light entrance surface 11 and the light exit surface 12 at constant (same) angles as with the light L1 regardless of the incidence positions and the emission positions. The refraction of these do not therefore influence the formation of the image.

As described above, the covering layer 24 formed on the surface of the band-shaped flat section 19 in the second step is peeled off in the third step and may thus have any of a light-transmissive property (transparent) and a non-light-transmissive property (opaque). However, when the covering material used to form the covering layer can also adhere to the inner surface of the straight groove including the vertical surface, a covering material is selected to form a covering layer having a light-transmissive property (transparent). This prevents the covering layer from blocking light when the aerial image formation device is used even if the surface (on which the covering layer is formed) of the vertical surface to which the covering material adheres is covered with a light reflecting material. It is possible to cause the surface of the light reflecting material closer to the vertical surface to function as the first or second light reflecting surface.

In addition, in the present embodiment, as illustrated in FIGS. 1(A) and (B), the one of the light control panels 28 and the other of the light control panels 28 are disposed and bonded together with the one surface side of the one of the light control panels 28 and the one surface side of the other of the light control panels 28 opposed to each other. As in an aerial image formation device 10a according to a modification example illustrated in FIGS. 6(A) and (B), the one of the light control panels 28 and the other of the light control panels 28 may be, however, disposed and bonded together with the other surface side of the one of the light control panels 28 and the other surface side of the other of the light control panels 28 opposed to each other or the one of the light control panels and the other of the light control panels may be disposed and bonded together with the one surface side of the one of the light control panels and the other surface side of the other light control panel opposed to each other. In any case, an operation similar to that of the aerial image formation device 10 allows an aerial image to be formed.

Subsequently, a method for manufacturing an aerial image formation device, and an aerial image formation device according to a second embodiment of the present invention will be described with reference to the drawings.

Figure 7:
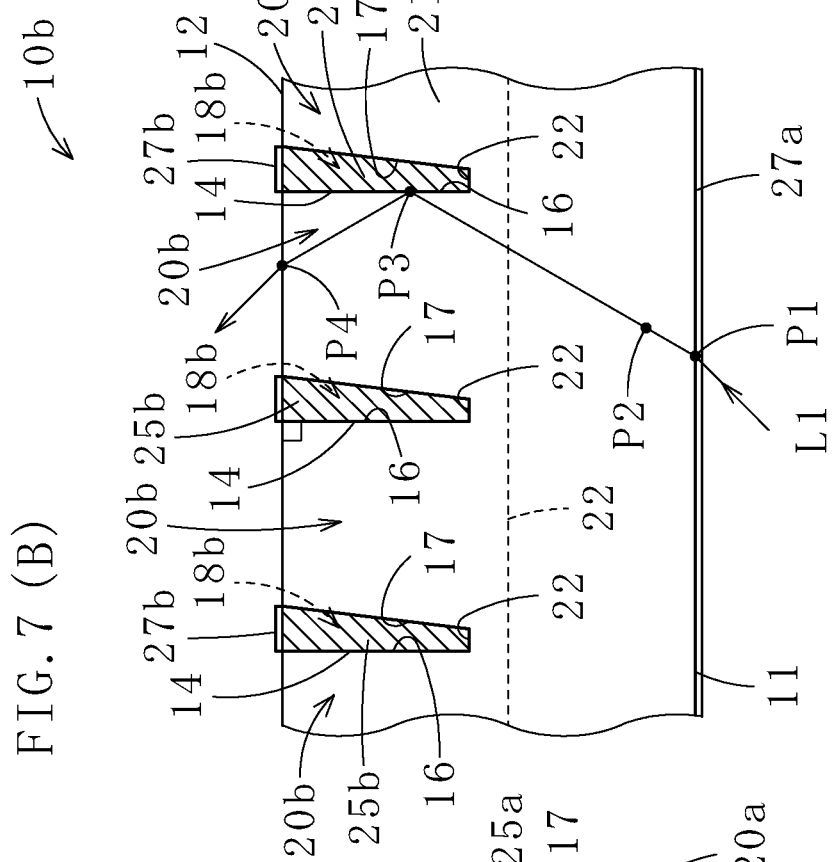
FIGS. 7(A) and 7(B) are respectively a sectional front view and a sectional side view of an aerial image formation device manufactured in a method for manufacturing an aerial image formation device according to a second embodiment of the present invention.
Figure 7:
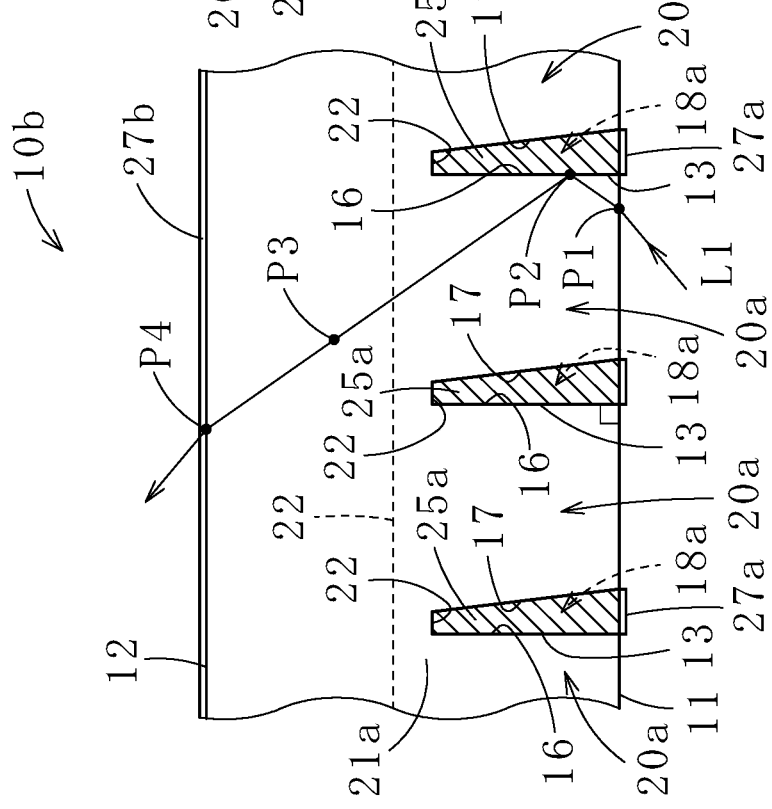

As illustrated in FIGS. 7(A) and (B), an aerial image formation device 10b manufactured in the method for manufacturing the aerial image formation device according to the second embodiment of the present invention is formed to have the shape of a flat plate having the light entrance surface 11 and the light exit surface 12. The light entrance surface 11 and the light exit surface 12 are disposed in parallel. The aerial image formation device 10b has the plurality of first light reflecting surfaces 13 and the plurality of second light reflecting surfaces 14. The plurality of first light reflecting surfaces 13 is each formed at right angle to the light entrance surface 11. The plurality of first light reflecting surfaces 13 is disposed in parallel at predetermined intervals. The plurality of second light reflecting surfaces 14 is each formed at right angle to the light exit surface 12. The plurality of second light reflecting surfaces 14 is disposed in parallel at predetermined intervals. The first light reflecting surfaces 13 and the second light reflecting surfaces 14 are disposed to be orthogonal to each other in a plan view. This aerial image formation device 10b is different from the aerial image formation devices 10 and 10a in that the plurality of first light reflecting surfaces 13 is formed on one surface side of one plate-shaped molding 21a produced by using a transparent resin and the plurality of second light reflecting surfaces 14 is formed on the other surface side of the molding 21a.

The following describes the method for manufacturing the aerial image formation device 10b.

A transparent resin is molded to form the plate-shaped molding 21a as illustrated in FIGS. 8(A) and (B). In the molding 21a, a plurality of first straight grooves 18a is disposed in parallel at a predetermined interval and a first protruded strip 20a is formed between the adjacent first straight grooves 18a on one surface side, and a plurality of second straight grooves 18b is disposed in parallel at a predetermined interval and a second protruded strip 20b is formed between the adjacent second straight grooves 18b on the other surface side. The plurality of first straight grooves 18a each expands on one surface side with one of side surfaces serving as the vertical surface 16 and the other side surface serving as the inclined surface 17. The plurality of first straight grooves 18a each has a trapezoidal cross section. The first protruded strip 20a includes a first band-shaped flat section 19a on one surface side. The first protruded strip 20a has a trapezoidal cross section. The plurality of second straight grooves 18b each expands on the other surface side with one of side surfaces serving as the vertical surface 16 and the other side surface serving as the inclined surface 17. The plurality of second straight grooves 18b each has a trapezoidal cross section. The second protruded strip 20b includes a second band-shaped flat section 19b on the other surface side. The second protruded strip 20b has a trapezoidal cross section. The vertical surface 16 of each of the first straight grooves 18a and the vertical surface 16 of each of the second straight grooves 18b being disposed to be orthogonal to each other in a plan view. This molding 21a corresponds to a molding obtained by integrally producing the moldings 21 of the two light control panels 28 constituting the aerial image formation device 10a. The bottom surface 22 of each of the first straight grooves 18a and the bottom surface 22 of each of the second straight grooves 18b have an interval d of about 20 to 3000 μm. It is to be noted that the shapes and dispositions of the first and second straight grooves 18a and 18b and the first and second protruded strips 20a and 20b are similar to those of the straight grooves 18 and the protruded strips 20 of the aerial image formation device 10a on the light entrance surface 11 side and the light exit surface 12 side, and will not be thus described. In addition, the transparent resin used to produce this molding 21a is similar to that of the first embodiment and will not be thus described (the above is a first step).

Next, as illustrated in FIGS. 9(A) and (B), the respective insides of the first and second straight grooves 18a and 18b of the molding 21a are filled with first and second light reflecting materials 25a and 25b such as metal paste. As a result, the respective inner surfaces (the respective inner surfaces of the first and second straight grooves 18a and 18b including the vertical surfaces 16, the inclined surfaces 17, and the bottom surfaces 22 here) of the first and second straight grooves 18a and 18b including the vertical surfaces 16 and the inclined surfaces 17 are covered with the first and second light reflecting materials 25a and 25b to produce an intermediate 26a. The first and second light reflecting materials 25a and 25b are the same materials and it is preferable that the respective insides of the first and second straight grooves 18a and 18b be selectively filled therewith. However, when the unnecessary first and second light reflecting materials adhere onto the respective surfaces of the first and second band-shaped flat sections 19a and 19b, it is possible to remove the unnecessary first and second light reflecting materials in a method such as peeling, polishing, or dissolving in a later step. It is to be noted that peelable first and second covering layers 24a and 24b formed on the respective surfaces of the first and second band-shaped flat sections 19a and 19b as indicated by a virtual line before this intermediate 26a is produced (before the respective insides of the first and second straight grooves 18a and 18b are filled with the first and second light reflecting materials 25a and 25b) make it possible to prevent the unnecessary first and second light reflecting materials from adhering to the respective surfaces of the first and second band-shaped flat sections 19a and 19b. The first and second covering layers 24a and 24b and the unnecessary first and second light reflecting materials adhering onto the first and second covering layers 24a and 24b are removed in a later step. (The above is a second step).

Next, as illustrated in FIGS. 10(A) and (B), first and second anti-reflection layers 27a and 27b are respectively formed on the surface of the first light reflecting material 25a on the one surface side and the surface of the second light reflecting material 25b on the other surface side. Each of the first straight grooves 18a is filled with the first light reflecting material 25a. Each of the second straight grooves 18b is filled with the second light reflecting material 25b. The first and second anti-reflection materials used to form the first and second anti-reflection layers 27a and 27b are similar to the anti-reflection materials used to form the anti-reflection layers 27 according to the first embodiment. It is preferable that the first and second anti-reflection materials be selectively formed on the surface of the first light reflecting material 25a on the one surface side and the surface of the second light reflecting material 25b on the other surface side. However, when the unnecessary first and second anti-reflection materials adhere to the respective surfaces of the first and second band-shaped flat sections 19a and 19b at the time of the formation of the first and second anti-reflection layers 27a and 27b, it is possible to remove the unnecessary first and second anti-reflection materials in a method such as peeling, polishing, or dissolving. It is to be noted that the peelable first and second covering layers 24a and 24b formed in advance on the respective surfaces of the first and second band-shaped flat sections 19a and 19b make it possible to prevent the unnecessary first and second anti-reflection materials from adhering onto the respective surfaces of the first and second band-shaped flat sections 19a and 19b as described above. After the first and second anti-reflection layers 27a and 27b are formed, the first and second covering layers 24a and 24b, and the unnecessary first and second light reflecting materials and the unnecessary first and second anti-reflection materials (adhering objects) adhering onto the first and second covering layers 24a and 24b are peeled off and removed with an adhesive tape or the like. As a result, the first and second anti-reflection layers 27a and 27b that cover the first and second light reflecting materials 25a and 25b are formed in the region of the intermediate 26a overlapping with each of the first straight grooves 18a on the one surface side and the region overlapping with each of the second straight grooves 18b on the other surface side in a plan view (the above is a third step).

The steps described above offer the aerial image formation device 10b including the molding 21a, the first and second light reflecting materials 25a and 25b, and the first and second anti-reflection layers 27a and 27b as illustrated in FIGS. 7(A) and (B). The molding 21a is produced by using a transparent resin. The molding 21a includes the plurality of first straight grooves 18a and the first protruded strip 20a on one surface side, and the plurality of second straight grooves 18b and the second protruded strip 20b on the other surface side. The plurality of first straight grooves 18a each expands on one surface side with one of side surfaces serving as the vertical surface 16 and the other side surface serving as the inclined surface 17. The plurality of first straight grooves 18a is disposed in parallel at a predetermined interval. The plurality of first straight grooves 18a each has a trapezoidal cross section. The first protruded strip 20a is formed between the adjacent first straight grooves 18a. The first protruded strip 20a includes the first band-shaped flat section 19a on one surface side. The first protruded strip 20a has a trapezoidal cross section. The plurality of second straight grooves 18b each expands on the other surface side with one of side surfaces serving as the vertical surface 16 and the other side surface serving as the inclined surface 17. The plurality of second straight grooves 18b is disposed in parallel at a predetermined interval. The plurality of second straight grooves 18b each has a trapezoidal cross section. The second protruded strip 20b is formed between the adjacent second straight grooves 18b. The second protruded strip 20b includes the second band-shaped flat section 19b on the other surface side. The second protruded strip 20b has a trapezoidal cross section. The first and second light reflecting materials 25a and 25b cover at least the vertical surfaces 16 and the inclined surfaces 17 of the respective inner surfaces of the first and second straight grooves 18a and 18b of the molding 21a. The first and second anti-reflection layers 27a and 27b cover the first and second light reflecting materials 25a and 25b in a region overlapping with each of the first straight grooves 18a in a plan view from the one surface side of the molding 21a and a region overlapping with each of the second straight grooves 18b in a plan view from the other surface side of the molding 21a. The vertical surface 16 of each of the first straight grooves 18a and the vertical surface 16 of each of the second straight grooves 18b are disposed to be orthogonal to each other in a plan view. A surface of the first light reflecting material 25a closer to the vertical surface 16 serves as the first light reflecting surface 13 and a surface of the second light reflecting material 25b closer to the vertical surface 16 serves as the second light reflecting surface 14. The first light reflecting material 25a covers the vertical surface 16 of each of the first straight grooves 18a. The second light reflecting material 25b covers each of the second straight grooves 18b.

Figure 6:
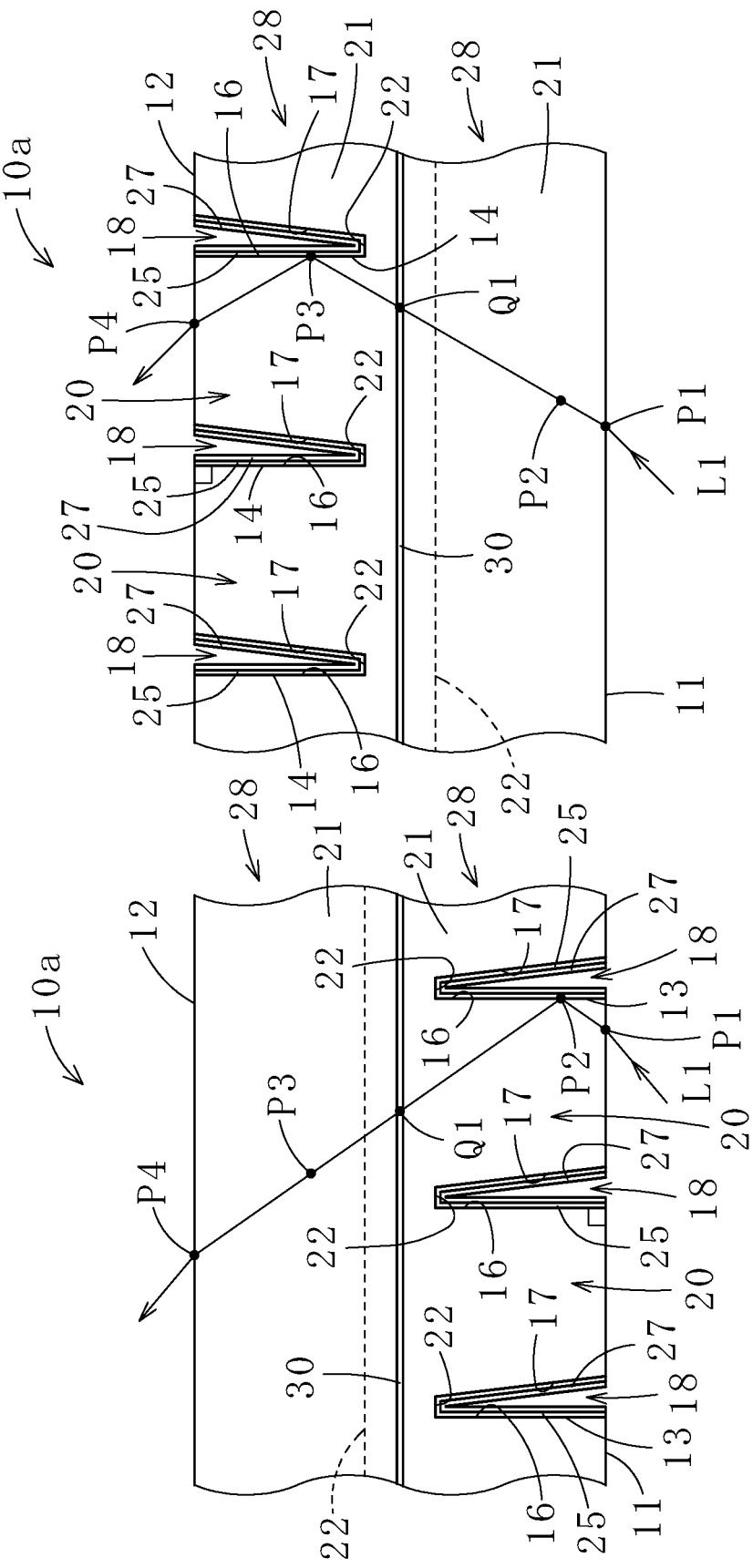
FIGS. 6(A) and 6(B) are respectively a sectional front view and a sectional side view each illustrating a modification example of the aerial image formation device manufactured in the method for manufacturing the aerial image formation device.

The shapes and dispositions of the first and second light reflecting surfaces 13 and 14 of this aerial image formation device 10b are similar to those of the aerial image formation device 10a in FIGS. 6(A) and (B). The aerial image formation device 10b is thus capable of forming an aerial image by performing an operation similar to that of the aerial image formation device 10a as illustrated in FIGS. 7(A) and (B).

Subsequently, a method for manufacturing an aerial image formation device, and an aerial image formation device according to a third embodiment of the present invention will be described with reference to the drawings.

An aerial image formation device 10c manufactured in the method for manufacturing the aerial image formation device according to the third embodiment of the present invention illustrated in FIGS. 11(A) and (B) is different from the aerial image formation device 10b (see FIGS. 7(a) and (b)) in that the respective whole insides of the first and second straight grooves 18a and 18b are filled with the first and second light reflecting materials 25a and 25b. The first and second anti-reflection layers 27a and 27b are not respectively formed on the surface of the first light reflecting material 25a on the one surface side and the surface of the second light reflecting material 25b on the other surface side, but the respective inner surfaces (the vertical surfaces 16, the inclined surfaces 17, and the bottom surfaces 22 here) of the first and second straight grooves 18a and 18b are covered with first and second light reflecting materials 25c and 25d instead. The aerial image formation device 10c includes a first cover material 31a and a second cover material 31b. The first cover material 31a covers each of the first straight grooves 18a and each of the first band-shaped flat sections 19a. The second cover material 31b covers each of the second straight grooves 18b and each of the second band-shaped flat sections 19b. First and second light-transmissive layers 33a and 33b are respectively formed in the region of the first cover material 31a overlapping with each first band-shaped flat section 19a and the region of the second cover material 31b overlapping with each second band-shaped flat section 19b. First and second anti-reflection layers 34a and 34b are respectively formed in the region of the first cover material 31a overlapping with each first straight groove 18a and the region of the second cover material 31b overlapping with each second straight groove 18b.

The following describes the method for manufacturing the aerial image formation device 10c.

First, the molding 21a illustrated in FIGS. 8(A) and (B) is formed in a first step similar to that of the method for manufacturing the aerial image formation device 10b (embodiment 2).

Next, as illustrated in FIGS. 12(A) and (B), after the peelable first and second covering layers 24a and 24b are formed on the respective surfaces of the first and second band-shaped flat sections 19a and 19b of the molding 21a, the respective vertical surfaces 16, the respective inclined surfaces 17, and the respective bottom surfaces 22 of the first and second straight grooves 18a and 18b are covered with the first and second light reflecting materials 25c and 25d. At this time, unnecessary first and second light reflecting materials 25c' and 25d' also adhere onto the first and second covering layers 24a and 24b, respectively. After that, the first and second covering layers 24a and 24b respectively formed on the first and second band-shaped flat sections 19a and 19b and the unnecessary first and second light reflecting materials 25c' and 25d' respectively adhering onto the first and second covering layers 24a and 24b are removed to produce an intermediate 26b illustrated in FIGS. 13(A) and (B). The first and second covering layers 24a and 24b and the first and second light reflecting materials 25c and 25d are respectively similar to the covering layers 24 and the light reflecting materials 25 described in the second step of the method for manufacturing the aerial image formation device 10 (embodiment 1), and will not be thus described in detail (the above is a second step).

Next, as illustrated in FIGS. 14(A) and (B), the first cover material 31a that has a non-light-transmissive property and covers each of the first straight grooves 18a and each of the first band-shaped flat sections 19a is disposed on the one surface side of the intermediate 26b. The second cover material 31b that has a non-light-transmissive property and covers each of the second straight grooves 18b and each of the second band-shaped flat sections 19b is disposed on the other surface side. The first and second cover materials 31a and 31b each having a non-light-transmissive property are each obtained by forming an adhesive layer 32a having a non-light-transmissive property (opaque) in the initial state on the back surface of a base material (e.g., a transparent sheet including a synthetic resin such as PET) 32 having a light-transmissive property. As the adhesive layer, an adhesive layer is favorably used that is, for example, black (opaque) and has a non-light-transmissive property and a light absorbing property in the initial state, but has characteristics that the adhesive layer is pressurized to proceed with adhesion (curing) and become transparent. For example, in the case of an adhesive layer formed by dispersing microcapsules in each of which a curing agent is encapsulated into a base resin, the microcapsules in the pressurized region crack, and the base resin and the curing agents react to proceed with adhesion (curing). This makes only the pressurized region transparent. Thus, when the intermediate 26b in FIGS. 14(A) and (B), with the first and second cover materials 31a and 31b laminated thereon is sandwiched and pressurized from both surfaces by a roller or the like, the region of the first cover material 31a overlapping with each of the first band-shaped flat sections 19a and the region of the second cover material 31b overlapping with each of the second band-shaped flat sections 19b are respectively bonded to the first and second band-shaped flat sections 19a and 19b and made transparent to form the first and second light-transmissive layers 33a and 33b as illustrated in FIGS. 11(A) and (B). This causes the region of the first cover material 31a overlapping with each of the first straight grooves 18a and the region of the second cover material 31b overlapping with each of the second straight grooves 18b to respectively serve as the first and second anti-reflection layers 34a and 34b and the aerial image formation device 10c is manufactured. It is to be noted that it is sufficient if the first and second cover materials each have a non-light-transmissive property, and a light absorbing property or a light diffusing property in the initial state and each have a function of selectively making only the pressurized region transparent. The configurations thereof are not limited to the configurations according to the present embodiment, but are selected as appropriate. For example, as the first and second cover materials, there may be used a base material having a light-transmissive property, and an adhesive layer, formed on the back surface of the base material, that is, for example, white or milk-white in the initial state and has a non-light-transmissive property and a light diffusing property and selectively becomes transparent in only the pressurized region. In this case, dents and protrusions are formed on the front surface and/or back surface of the adhesive layer and the adhesive layer looks white or milk-white in the initial state because light is dispersed. The adhesive layer is, however, selectively pressurized to have the dents and protrusions made even and becomes flat. This makes the pressurized region of the adhesive layer transparent to form a light-transmissive layer. The region of the adhesive layer that is not pressurized keeps the non-light-transmissive property and the light diffusing property in the initial state and functions as the first or second anti-reflection layer (the above is a third step).

The shapes and dispositions of the first and second light reflecting surfaces 13 and 14 of the aerial image formation device 10c in FIGS. 11(A) and (B) manufactured as described above are similar to those of the aerial image formation device 10a in FIGS. 6(A) and (B) and the aerial image formation device 10b in FIGS. 7(A) and (B). The aerial image formation device 10c is thus capable of forming an aerial image by performing an operation similar to that of any of the aerial image formation devices 10a and 10b as illustrated in FIGS. 11(A) and (B).

The present invention has been described above with reference to the embodiments, but the present invention is not limited to the configurations according to the embodiments described above in any ways. The present invention also includes another embodiment and another modification example that are possible within the scope of the claims. The present invention includes a case where an aerial image formation device is manufactured by combining the methods (the respective steps) for manufacturing the aerial image formation devices according to the respective embodiments.

For example, steps similar to the second step and the third step according to the second embodiment may be applied instead of the second step and the third step according to the first embodiment or steps similar to the second step and the third step according to the first embodiment may be applied instead of the second step and the third step according to the second embodiment. In addition, steps similar to the second step and the third step according to the third embodiment may be applied instead of the second step and the third step according to the first embodiment or steps similar to the second step and the third step according to the first embodiment may be applied instead of the second step and the third step according to the third embodiment. When the steps similar to the second step and the third step according to the third embodiment are applied instead of the second step and the third step according to the first embodiment, a cover material is laminated on one surface side of an intermediate, an anti-reflection layer is formed, a light control panel is manufactured, and two light control panels are then combined in the fourth step to manufacture an aerial image formation device. It is to be noted that two intermediates are produced by applying the step similar to the second step according to the third embodiment to moldings according to the first embodiment, cover materials are laminated on the one surface sides of the respective intermediates to cover the respective straight grooves and the respective band-shaped flat sections, and the intermediates are pressurized in this state, thereby performing a step of manufacturing light control panels and a step of bonding the two light control panels together at the same time to manufacture an aerial image formation device. Thus, the steps are simplified.

In addition, even when the light entrance surface and the light exit surface of any of the aerial image formation devices are exchanged by inverting the upper and lower (front and back) surfaces, it is possible to form an aerial image as in the embodiments described above.

INDUSTRIAL APPLICABILITY

A method for manufacturing an aerial image formation device according to the present invention makes it possible to mass-produce aerial image formation devices that can obtain a clear aerial image with a simple manufacturing step and at low manufacturing cost. In addition, an aerial image formation device according to the present invention is capable of displaying an aerial image, for example, on a display section of a medical device, an electronic product, an automobile, an aircraft, a vessel, a gaming device, an advertising tower, or the like and also applicable to a contactless input device or the like.

REFERENCE SIGNS LIST 10, 10a, 10b, 10c: aerial image formation device, 11: light entrance surface, 12: light exit surface, 13: first light reflecting surface, 14: second light reflecting surface, 16: vertical surface, 17: inclined surface, 18: straight groove, 18a: first straight groove, 18b: second straight groove, 19: band-shaped flat section, 19a: first band-shaped flat section, 19b: second band-shaped flat section, 20: protruded strip, 20a: first protruded strip, 20b: second protruded strip, 21, 21a: molding, 22: bottom surface, 24: covering layer, 24a: first covering layer, 24b: second covering layer, 25: light reflecting material, 25': unnecessary light reflecting material, 25a: first light reflecting material, 25b: second light reflecting material, 25c: first light reflecting material, 25d: second light reflecting material, 25c': unnecessary first light reflecting material, 25d': unnecessary second light reflecting material, 26, 26a, 26b: intermediate, 27:

anti-reflection layer, 27*a*: first anti-reflection layer, 27*b*: second anti-reflection layer, 28: light control panel, 30: transparent adhesive layer, 31*a*: first cover material, 31*b*: second cover material, 32: base material, 32*a*: adhesive layer, 33*a* first light-transmissive layer, 33*b* second light-transmissive layer, 34*a*: first anti-reflection layer, 34*b*: second anti-reflection layer

The invention claimed is:

1. A method for manufacturing an aerial image formation device, the aerial image formation device being formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view, the method comprising:

a first step of molding a transparent resin to form a plate-shaped molding in which, on one surface side of the molding, (a) a plurality of first straight grooves, each having a triangular cross section or a trapezoidal cross section, each expanding on the one surface side of the molding, and each having one side surface serving as a vertical surface and another side surface serving as an inclined surface, is disposed in parallel at a predetermined interval and (b) a first protruded strip having a trapezoidal cross section and including a first band-shaped flat section on the one surface side of the molding is formed between the first straight grooves adjacent to each other, and, on another surface side of the molding, (c) a plurality of second straight grooves, each having a triangular cross section or a trapezoidal cross section, each expanding on the other surface side of the molding, and each having one side surface serving as a vertical surface and another side surface serving as an inclined surface, is disposed in parallel at a predetermined interval and (d) a second protruded strip having a trapezoidal cross section and including a second band-shaped flat section on the other surface side of the molding is formed between the second straight grooves adjacent to each other, the vertical surface of each of the first straight grooves and the vertical surface of each of the second straight grooves being disposed to be orthogonal to each other in a plan view;

a second step of covering at least the vertical surfaces and the inclined surfaces of respective inner surfaces of the first and second straight grooves of the molding with first and second light reflecting materials to produce an intermediate; and a third step of forming a first anti-reflection layer that covers the first light reflecting material in a region overlapping with each of the first straight grooves in a plan view from one surface side of the intermediate and forming a second anti-reflection layer that covers the second light reflecting material in a region overlapping with each of the second straight grooves in a plan view from another surface side of the intermediate to manufacture an aerial image formation device in which a surface of the first light reflecting material covering the vertical surface of each of the first straight grooves serves as the first light reflecting surface, the surface being on a side closer to the vertical surface of each of the first straight grooves, and a surface of the second light reflecting material covering the vertical surface of each of the second straight grooves serves as the second light reflecting surface, the surface being on a side closer to the vertical surface of each of the second straight grooves.

2. The method for manufacturing the aerial image formation device according to claim 1, wherein, in the second step, respective insides of the first and second straight grooves of the molding are filled with the first and second light reflecting materials to cover the respective inner surfaces of the first and second straight grooves including the vertical surfaces and the inclined surfaces with the first and second light reflecting materials, and in the third step, the first and second anti-reflection layers are formed on a surface, which is on the one surface side of the intermediate, of the first light reflecting material with which each of the first straight grooves is filled and a surface, which is on the other surface side of the intermediate, of the second light reflecting material with which each of the second straight grooves is filled.

3. The method for manufacturing the aerial image formation device according to claim 1, wherein, in the second step, after peelable first and second covering layers are formed on at least respective surfaces of the first and second band-shaped flat sections of the molding, at least the respective vertical surfaces and the respective inclined surfaces of the first and second straight grooves are covered with the first and second light reflecting materials to produce the intermediate, and in the third step, after the first and second light reflecting materials that cover at least the respective inner surfaces of the first and second straight grooves of the intermediate are covered with first and second anti-reflection materials, the first and second covering layers respectively formed on the first and second band-shaped flat sections, unnecessary first and second light reflecting materials respectively adhering onto the first and second covering layers, and unnecessary first and second anti-reflection materials respectively adhering onto the first and second covering layers are removed to form the first and second anti-reflection layers.

4. The method for manufacturing the aerial image formation device according to claim 1, wherein, in the third step, a first cover material having a non-light-transmissive property and covering each of the first straight grooves and each of the first band-shaped flat sections is disposed on the one surface side of the intermediate, a second cover material having a non-light-transmissive property and covering each of the second straight grooves and each of the second band-shaped flat sections is disposed on the other surface side of the intermediate, and a region of the first cover material overlapping with each of the first band-shaped flat sections and a region of the second cover material overlapping with each of the second band-shaped flat sections are pressurized to be respectively bonded to the first and second band-shaped flat sections and made transparent to form the first and second anti-reflection layers respectively in a region of the first cover material overlapping with each of the first straight grooves and a region of the second cover material overlapping with each of the second straight grooves.

5. The method for manufacturing the aerial image formation device according to claim 4, wherein, in the second step before the third step, after peelable first and second covering layers are formed on at least respective surfaces of the first and second band-shaped flat sections of the molding, and at least the respective vertical surfaces and the respective inclined surfaces of the first and second straight grooves are covered with the first and second light reflecting materials, the first and second covering layers respectively formed on the first and second band-shaped flat sections and unnecessary first and second light reflecting materials respectively adhering onto the first and second covering layers are removed to produce the intermediate.

6. A method for manufacturing an aerial image formation device, the aerial image formation device being formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view, the method comprising:
- a first step of molding a transparent resin to produce a plate-shaped molding in which, on one surface side of the molding, (a) a plurality of straight grooves, each having a triangular cross section or a trapezoidal cross section, each expanding on the one surface side of the molding, and each having one side surface serving as a vertical surface and another side surface serving as an inclined surface, is disposed in parallel at a predetermined interval and (b) a protruded strip having a trapezoidal cross section and including a band-shaped flat section on the one surface side of the molding is formed between the straight grooves adjacent to each other;
- a second step of covering at least the vertical surface and the inclined surface of an inner surface of each of the straight grooves of the molding with a light reflecting material to produce an intermediate;
- a third step of forming an anti-reflection layer that covers the light reflecting material in a region overlapping with each of the straight grooves in a plan view from one surface side of the intermediate to manufacture a light control panel; and
- a fourth step of using the two light control panels and disposing the two light control panels with one surface side or another surface side of the one of the light control panels and one surface side or another surface side of the other of the light control panels opposed to each other to cause the vertical surface of each of the straight grooves of the one of the light control panels and the vertical surface of each of the straight grooves of the other of the light control panels to be orthogonal to each other in a plan view to manufacture an aerial image formation device in which a surface of the light reflecting material that covers the vertical surface of each of the straight grooves of the one of the light control panels serves as the first light reflecting surface, the surface being on a side closer to the vertical surface of each of the straight grooves of the one of the light control panels, and a surface of the light reflecting material that covers the vertical surface of each of the straight grooves of the other of the light control panels serves as the second light reflecting surface, the surface being on a side closer to the vertical surface of each of the straight grooves of the other of the light control panels.

7. The method for manufacturing the aerial image formation device according to claim 6, wherein, in the second step, inside of each of the straight grooves of the molding is filled with the light reflecting material to cover the inner surface of each of the straight grooves including the vertical surface and the inclined surface with the light reflecting material, and in the third step, the anti-reflection layer is formed on a surface, which is on the one surface side of the intermediate, of the light reflecting material with which each of the straight grooves is filled.

8. The method for manufacturing the aerial image formation device according to claim 6, wherein, in the second step, after a peelable covering layer is formed on at least a surface of each of the band-shaped flat sections of the molding, at least the vertical surface and the inclined surface of each of the straight grooves are covered with the light reflecting material to produce the intermediate, and in the third step, after the light reflecting material that covers at least the inner surface of each of the straight grooves of the intermediate is covered with an anti-reflection material, the covering layer formed on each of the band-shaped flat sections, an unnecessary light reflecting material adhering onto each of the covering layers, and an unnecessary anti-reflection material adhering onto each of the covering layers are removed to form the anti-reflection layer.

9. The method for manufacturing the aerial image formation device according to claim 6, wherein, in the third step, a cover material having a non-light-transmissive property and covering each of the straight grooves and each of the band-shaped flat sections is disposed on the one surface side of the intermediate, and a region of the cover material overlapping with each of the band-shaped flat sections is pressurized to be bonded to each of the band-shaped flat sections and made transparent to form the anti-reflection layer in a region of the cover material overlapping with each of the straight grooves.

10. The method for manufacturing the aerial image formation device according to claim 9, wherein, in the second step before the third step, after a peelable covering layer is formed on at least a surface of each of the band-shaped flat sections of the molding and at least the vertical surface and the inclined surface of each of the straight grooves are covered with the light reflecting material, the covering layer formed on each of the band-shaped flat sections and an unnecessary light reflecting material adhering onto each of the covering layers are removed to produce the intermediate.

11. An aerial image formation device that is formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view, the aerial image formation device comprising:
- a molding;
- first and second light reflecting materials; and
- first and second anti-reflection layers, the molding being produced by using a transparent resin, the molding including, on one surface side thereof, a plurality of first straight grooves disposed in parallel at a predetermined interval and a first protruded strip formed between the first straight grooves adjacent to each other, the plurality of first straight grooves each having a triangular cross section or a trapezoidal cross section, each expanding on the one surface side of the molding, and each having one side surface serving as a vertical surface and another side surface serving as an inclined surface, the first protruded strip having a trapezoidal cross section and including a first band-shaped flat section on the one surface side of the molding, the molding including on another side surface thereof, a plurality of second straight grooves disposed in parallel at a predetermined interval and a second protruded strip formed between the second straight grooves adjacent to each other, the plurality of second straight grooves each having a triangular cross section or a trapezoidal cross section, each expanding on the other surface side of the molding, and each having one side surface serving as a vertical surface and another side surface serving as an inclined surface, the second protruded strip having a trapezoidal cross section and including a second band-shaped flat section on the other surface side of the molding, the first and second light reflecting materials covering at least the vertical surfaces and the inclined surfaces of respective inner surfaces of the first and second straight grooves of the molding, the first and second anti-reflection layers covering the first and second light reflecting materials respectively in a region overlapping with each of the first straight grooves in a plan view from the one surface side of the molding and a region overlapping with each of the second straight grooves in a plan view from the other surface side of the molding, wherein the vertical surface of each of the first straight grooves and the vertical surface of each of the second straight grooves are disposed to be orthogonal to each other in a plan view, a surface of the first light reflecting material covering the vertical surface of each of the first straight grooves serves as the first light reflecting surface, the surface being on a side closer to the vertical surface of each of the first straight grooves, and a surface of the second light reflecting material covering each of the second straight grooves serves as the second light reflecting surface, the surface being on a side closer to the vertical surface of each of the second straight grooves.

12. The aerial image formation device according to claim 11, comprising a first cover material and a second cover material, the first cover material covering each of the first straight grooves and each of the first band-shaped flat sections on the one surface side of the molding, the second cover material covering each of the second straight grooves and each of the second band-shaped flat sections on the other surface side of the molding, wherein first and second light-transmissive layers are respectively formed in a region of the first cover material overlapping with each of the first band-shaped flat sections and a region of the second cover material overlapping with each of the second band-shaped flat sections, and the first and second anti-reflection layers are respectively formed in a region of the first cover material overlapping each of the first straight grooves and a region of the second cover material overlapping with each of the second straight grooves.

13. An aerial image formation device that is formed to have a shape of a flat plate having a light entrance surface and a light exit surface, the light entrance surface and the light exit surface being disposed in parallel, the aerial image formation device having a plurality of first light reflecting surfaces disposed in parallel at a predetermined interval and a plurality of second light reflecting surfaces disposed in parallel at a predetermined interval, the plurality of first light reflecting surfaces being each formed at right angle to the light entrance surface, the plurality of second light reflecting surfaces being each formed at right angle to the light exit surface, the first light reflecting surfaces and the second light reflecting surfaces being disposed to be orthogonal to each other in a plan view, the aerial image formation device comprising, two light control panels each including a molding, a light reflecting material, and an anti-reflection layer, the molding being produced by using a transparent resin, the molding including, on one surface side thereof, a plurality of straight grooves disposed in parallel at a predetermined interval and a protruded strip formed between the straight grooves adjacent to each other, the plurality of straight grooves each having a triangular cross section or a trapezoidal cross section, each expanding on the one surface side of the molding, and each having one side surface serving as a vertical surface and another side surface serving as an inclined surface, the protruded strip having a trapezoidal cross section and including a band-shaped flat section on the one surface side of the molding, the light reflecting material covering at least the vertical surface and the inclined surface of an inner surface of each of the straight grooves of the molding, the anti-reflection layer covering the light reflecting material in a region overlapping with each of the straight grooves in a plan view from the one surface side of the molding, wherein the two light control panels are disposed with one surface side or another surface side of one of the light control panels and one surface side or another surface side of the other of the light control panels opposed to each other to cause the vertical surface of each of the straight grooves of the one of the light control panels and the vertical surface of each of the straight grooves of the other of the light control panels to be orthogonal to each other in a plan view, a surface of the light reflecting material that covers the vertical surface of each of the straight grooves of the one of the light control panels serves as the first light reflecting surface, the surface being on a side closer to the vertical surface of each of the straight grooves of the one of the light control panels, and a surface of the light reflecting material that covers the vertical surface of each of the straight grooves of the other of the light control panels serves as the second light reflecting surface, the surface being on a side closer to the vertical surface of each of the straight grooves of the other of the light control panels.

14. The aerial image formation device according to claim 13, comprising cover materials that cover the respective straight grooves and the respective band-shaped flat sections on the one surface sides of the respective light control panels, wherein light-transmissive layers are each formed in a region of each of the cover materials overlapping with each of the band-shaped flat sections and the anti-reflection layers are each formed in a region of each of the cover materials overlapping with each of the straight grooves.

\* \* \* \* \*